United States Patent

Terashita

[11] Patent Number: 5,162,841
[45] Date of Patent: Nov. 10, 1992

[54] EXPOSURE CONTROLLING APPARATUS

[75] Inventor: Takaaki Terashita, Kanagawa, Japan

[73] Assignee: Fuji Photo Film Co., Ltd., Kanagawa, Japan

[21] Appl. No.: 593,922

[22] Filed: Oct. 5, 1990

[30] Foreign Application Priority Data

| Oct. 11, 1989 | [JP] | Japan | 1-264729 |
| Feb. 5, 1990 | [JP] | Japan | 1-25497 |
| Feb. 5, 1990 | [JP] | Japan | 2-25498 |
| Feb. 5, 1990 | [JP] | Japan | 2-25499 |

[51] Int. Cl.$^5$ .............................................. G03B 27/80
[52] U.S. Cl. .................................... 355/38; 355/68; 355/77
[58] Field of Search ........................ 355/38, 68, 77; 356/444, 404

[56] References Cited

U.S. PATENT DOCUMENTS

| 4,093,375 | 6/1978 | Griesch et al. | 355/68 |
| 4,707,118 | 11/1987 | Terashita | 355/38 |
| 4,942,424 | 7/1990 | Terashita et al. | 355/38 |
| 5,036,351 | 7/1991 | Frick et al. | 355/38 |

FOREIGN PATENT DOCUMENTS

| 0312499 | 4/1989 | European Pat. Off. |
| 5888624 | 5/1983 | Japan . |
| 6195525 | 5/1986 | Japan . |
| 1134353 | 5/1989 | Japan . |
| 1142719 | 6/1989 | Japan . |
| 3737775 | 5/1989 | Netherlands . |
| 3938841 | 8/1990 | Netherlands . |

Primary Examiner—Michael L. Gellner
Assistant Examiner—D. Rutledge
Attorney, Agent, or Firm—Sughrue, Mion, Zinn, Macpeak & Seas

[57] ABSTRACT

An exposure controlling apparatus includes a sensor for effecting photometry by separating light from an original picture into a plurality of separated components; a storage device for storing a value concerning the spectral sensitivity of the sensor and a value concerning the spectral sensitivity of a copying sensitive material to be copied; an estimating device for estimating a spectral characteristic of the original picture on the basis of a photometric value of the sensor and the value concerning the spectral sensitivity of the sensor stored in the storage device; and a controller for determining a synthetic value which is equivalent to a value measured by a sensor having a spectral sensitivity distribution identical with or similar to a spectral sensitivity distribution of the copying sensitive material on the basis of the spectral characteristics of the original picture estimated and the value concerning the spectral sensitivity of the copying sensitive material, and for controlling exposure amount on the basis of the synthetic value. Accordingly, it is possible to control exposure amount by estimating the spectral characteristics of the original picture even from photometric values obtained by effecting photometry by separating the light into components having a wide half-width.

21 Claims, 26 Drawing Sheets

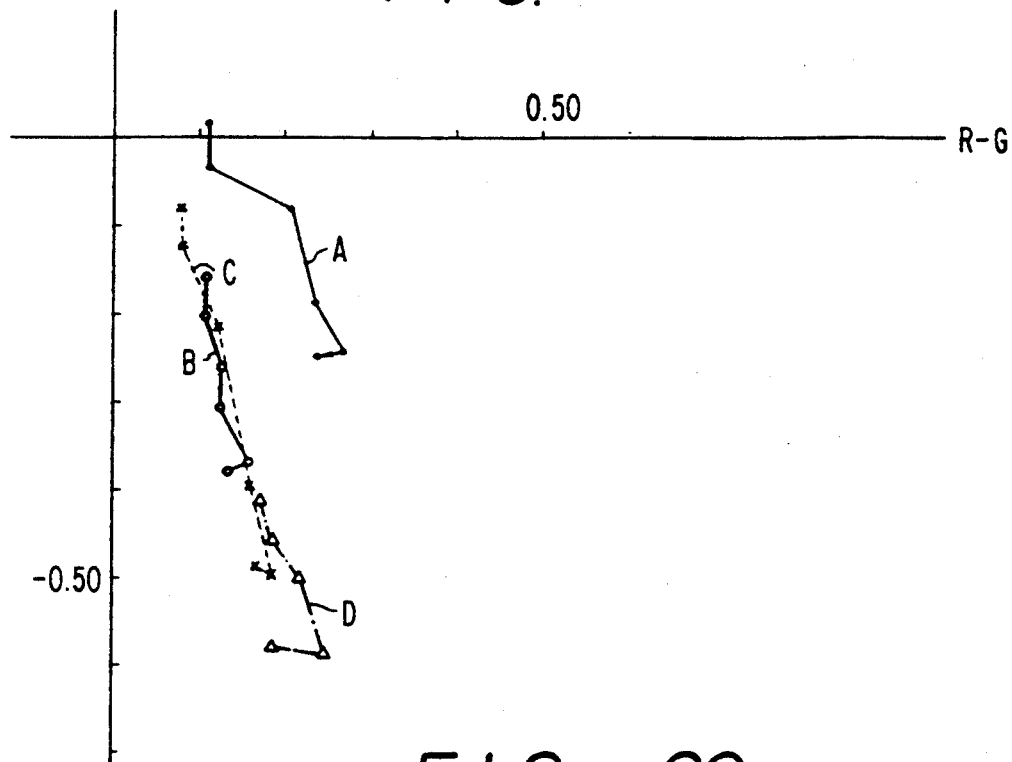

CORRECTED PHOTOMETRIC DATA

A B C D E F G H

A B C D E FGH
POSITION OF PICTURE

DIRECTION OF SPECTRUM

5,162,841

EXPOSURE CONTROLLING APPARATUS

BACKGROUND OF THE INVENTION

The present invention relates to an exposure controlling apparatus, and more particularly to an exposure controlling apparatus for controlling the exposure amount of an image copying apparatus such as an automatic photographic printer for printing an image on a copying sensitive material from a color original picture, particularly on a color print paper from a color film.
Description of the Related Art:

In general, when a color image is reproduced on a copying sensitive material from a color original picture, exposure amount is determined for the respective colors of red (R), green (G), and blue (B) by measuring the integral transmittance (or reflection) density of the R, G and B light by using a photometric device having color separation filters constituted by dyed filters and deposited filters. In order to determine exposure amount accurately, it is necessary to photometrically determine the exposure amount which actually contributes to the sensitization of the copying sensitive material. For this purpose, it is necessary to make the spectral sensitivity distribution of the photometric device coincide with the spectral sensitivity distribution of the copying sensitive material. The spectral sensitivity distribution of the copying sensitive material is asymmetrical about a wavelength at which sensitivity becomes maximum. With dyed filters and deposited filters, however, in order to fabricate them in such a manner that the transmittance distribution becomes asymmetrical, it is necessary to combine a multiplicity of filters, so that it is difficult to mass produce them and also difficult to fabricate them with a high degree of accuracy.

Accordingly, in photo-resist exposure apparatus, a technique is known in which the spectral sensitivity distribution of a photometric device is made to coincide with the spectral sensitivity distribution of a copying sensitive material by separating the light from an original picture into spectral components and effecting processing by adding weight to the separated components. Japanese Patent Laid-Open No. 88624/1983 discloses a photo resist exposure apparatus in which the aforementioned processing is effected by using a diffraction grating, a convergent optical system, and a photo-detector. However, a complicated mechanism is required so as to ensure that spectral sensitivity characteristics will not change due to the relative arrangement of these optical elements. Japanese Patent Laid-Open No. 95525/1986 discloses a photo resist exposure apparatus in which a multiplicity of interference filters are disposed instead of the aforementioned diffraction grating, the light transmitted through an original picture is separated into spectral components, and processing is effected by adding weight to the separated components. However, since the multiplicity of interference filters are required, a problem exists in that in cases where the number of photometric wavelengths is large, it is difficult to mass produce the interference filters by maintaining the spectral accuracy of the filters. Also, there is an additional problem in that since the separated components obtained from the interference filters exhibit a broad spectral distribution, even if a weighting addition is merely effected, the accuracy would be insufficient for the purpose of this application. In addition, with respect to color photographic printers, Japanese Patent Laid-Open No. 134353/1989 discloses a technique in which light from an original picture is subjected to spectral separation using a prism and a diffraction grating or a spectral filter, and an image of a part of a copy original is formed on a panel of a photoelectric sensor into the configuration of a slit. In this technique, different photometric positions are represented by rows of the panel, while spectral light corresponding to the photometric positions is converted to electric signals by columns of the panel. In this technique, the same problem as the one described above is encountered since the diffraction grating or the spectral filter is employed. Furthermore, since the light is separated into a multiplicity of spectral components of light, there is a problem in that the quantity of each spectral component of light is small, resulting in a shortage of the quantity of light. In addition, since the light is separated through diffraction by the use of the prism, there are drawbacks in that it is necessary to make the projected light into parallel light, that the apparatus becomes large in size, that the quantity of light decreases substantially since the light is separated into both rows and columns, and that a large difference in the quantity of light results for each spectrum, thereby making it impossible to effect photometry by using the same panel. Japanese Patent Laid-Open No. 142719/1989 also discloses the use of a prism or a diffraction grating, and a lens, and a two-dimensional array sensor. However, in this arrangement as well, the same drawbacks as those described above are encountered since the prism or the diffraction grating is used.

In order to overcome the conventional drawback of the quantity of light becoming short, it suffices to effect photometry by using spectral light having a wide half-width (e.g., 5-20 nm), or using light having greater diffusion than parallel light. Nevertheless, photometric values fail to express values measured by the spectral sensitivity distribution of the copying sensitive material owing to the broadening of the range of the photometric wavelengths.

SUMMARY OF THE INVENTION

The present invention has been made in view of the above circumstances and has a primary object to provide a compact exposure controlling apparatus capable of being mass produced at low cost and of overcoming a shortage of the quantity of light by estimating the spectral characteristics of an original picture by conducting photometry after separating the light into spectral light having a wide half-width.

Another object of the present invention is to provide an exposure controlling apparatus capable of improving color correction performance.

Still another object of the present invention is to provide an exposure controlling apparatus having a photometric sensor exhibiting a spectral sensitivity distribution of high accuracy.

To attain the aforementioned objects, in accordance with the invention there is provided an exposure controlling apparatus comprising: a sensor for effecting photometry by separating light from an original picture into a plurality of separated components; storage means for storing a value concerning the spectral sensitivity of the sensor and a value concerning the spectral sensitivity of a copying sensitive material to be copied; estimating means for estimating a spectral characteristic of the original picture on the basis of a photometric value of the sensor and the value concerning the spectral sensitivity of the sensor stored in the storage means; and controlling means for determining a synthetic value which is equivalent to a value measured by a sensor having a spectral sensitivity distribution identical with or similar to a spectral sensitivity distribution of the copying sensitive material on the basis of the spectral characteristics of the original picture estimated and the value concerning the spectral sensitivity of the copying sensitive material, and for controlling exposure amount on the basis of the synthetic value.

Adjacent ones of the plurality of separated components may have wavelength bands which overlap each other.

The sensor may have a wedge-shaped or stepped interference filter which is provided with an interference film disposed on a transparent substrate and having varying thicknesses at different positions thereof, the interference filter being adapted to separate the light from the original picture into a multiplicity of separated components.

It is effective if the sensor is arranged to effect photometry by separating a wavelength band corresponding to a maximum sensitivity wavelength band of the copying sensitive material into a plurality of separated components.

In addition, the exposure controlling apparatus may comprise: a sensor for effecting photometry by separating light from an original picture into a plurality of separated components; storage means for storing peculiar values obtained by integrating spectral sensitivity distributions of the sensor corresponding to the respective separated components over very fine wavelength sections including a central wavelength of each of the separated components, and spectral sensitivities of a copying sensitive material corresponding to the very small wavelength sections; estimating means for estimating spectral characteristics of the original picture corresponding to the respective very small wavelength sections on the basis of photometric values of the sensor corresponding to the respective separated components and the peculiar values stored in the storage means; and controlling means for determining a synthetic value which is equivalent to a value measured by a sensor having a spectral sensitivity distribution identical with or similar to a spectral sensitivity distribution of the copying sensitive material by integrating the product of the respective spectral characteristics of original picture estimated and the respective spectral sensitivities of the copying sensitive material, and for controlling exposure amount on the basis of the synthetic value.

Referring now to FIGS. 7A to 7C, a description will be given of the basic principle of the present invention. As shown in FIG. 7A, it is assumed that a spectral characteristic curve based on actual measurements obtained when an original picture was photometrically measured by separating the light from the original picture into three separated components by using sensors arranged as shown in FIG. 7B is expressed by $f_1(\lambda)$ and that a true spectral characteristic curve is expressed by $f_2(\lambda)$. The spectral characteristics referred to herein mean a spectral transmittance distribution, a spectral reflectance distribution, a spectral density distribution, and a spectral reflection density distribution, or characteristics and values corresponding thereto. It should be noted that $S_{\lambda 1}$, $S_{\lambda 2}$, $S_{\lambda 3}$ in FIG. 7B show respective spectral sensitivity distributions of sensors $S_1$, $S_2$, $S_3$. Since the spectral characteristics of an original picture (i.e., film color matter) exhibit a gentle distribution curve, it is possible to estimate them with a small number of wavelengths. Accordingly, dividing points are determined as $\lambda_0 < \lambda_1 < \lambda_2 < \lambda_3$ in such a manner that $\lambda_1$ becomes an intermediate wavelength between the central wavelengths of $S_{\lambda 1}$ and $S_{\lambda 3}$, $\lambda_2$ becomes an intermediate wavelength between $S_{\lambda 2}$ and $S_{\lambda 3}$, $\lambda_0$ is selected so that the central wavelength of $S_{\lambda 1}$ is located at a mid-point between $\lambda_0$ and $\lambda_1$, and $\lambda_3$ is selected so that the central wavelength of $S_{\lambda 3}$ is located at a mid-point between $\lambda_2$ and $\lambda_3$. The spectral sensitivity distribution of each sensor is divided into small sections $[\lambda_0, \lambda_1]$, $[\lambda_1, \lambda_2]$, and $[\lambda_2, \lambda_3]$ and it is assumed that, for instance, spectral characteristics a–b of the original picture are approximated by c–d. It is assumed that true values at the central wavelengths within the small sections are $T_1$, $T_2$, and $T_3$, actual measurements are $F_1$, $F_2$, and $F_3$, and the spectral sensitivity distributions of the sensor are $S_{\lambda 1}$, $S_{\lambda 1}$, and $S_{\lambda 3}$. In addition, it is assumed that the spectral sensitivity distribution of the copying sensitive material is expressed by FIG. 7C, and the spectral sensitivities of the copying sensitive material at the central wavelength of each sensor are $P_1$, $P_2$, and $P_3$. The actual measurement $F_2$ in the small section $[\lambda_1, \lambda_2]$ can be expressed by using true values and the spectral sensitivity distributions of respective regions of the sensor, as follows:

$$F_2 = T_1 \cdot \int_{\lambda_0}^{\lambda_1} S_{\lambda 2} d\lambda + T_2 \cdot \int_{\lambda_1}^{\lambda_2} S_{\lambda 2} d\lambda + T_3 \cdot \int_{\lambda_2}^{\lambda_3} S_{\lambda 2} d\lambda \quad (1)$$

It should be noted that actual measurements $F_1$, $F_2$ can also be obtained in a similar manner as described above.

The above Formula (1) can be generally expressed as follows:

$$F_i = T_{j-1} \int_{\lambda_{j-2}}^{\lambda_{j-1}} S_{\lambda i} d\lambda + T_j \int_{\lambda_{j-1}}^{\lambda_j} S_{\lambda i} d\lambda + T_{j+1} \int_{\lambda_j}^{\lambda_{j-1}} S_{\lambda i} d\lambda \quad (2)$$

where j is a number allotted in correspondence with a wavelength, and j = 1, 2, 3, ..., or n, and i is a number allotted in correspondence with a peak value of the spectral sensitivity of the sensor, i.e., a number allotted in correspondence with each region of the sensor, and in the above-described case, i = 1, 2, or 3.

If a generalization is made under the assumption that there are n regions of the sensor, and the light is separated into n separated components so as to effect photometry, the following formula can be obtained:

$$F_i = \sum_{j=1}^{n} T_j \int_{\lambda_{j-1}}^{\lambda_j} S_{\lambda i} d\lambda \quad (3)$$

If the spectral sensitivity distributions of the sensor are have already been measured in advance, the spectral sensitivity $S_{\lambda i}$ within an arbitrary section $[j-1, j]$ can be determined in advance, so that $$\int_{\lambda_{j-1}}^{\lambda_j} S_{\lambda i} d\lambda$$

in Formula (3) above becomes a predetermined value peculiar to the sensor. If this peculiar value is set as $S_{ij}$, the relationship among the true value, the actual measurement, and the peculiar value can be expressed as matrix as follows:

$$F = T \cdot S \text{ where} \quad (4)$$

$$T = \begin{Bmatrix} T_1 \\ T_2 \\ \cdot \\ \cdot \\ \cdot \\ T_n \end{Bmatrix}, T = \begin{Bmatrix} F_1 \\ F_2 \\ \cdot \\ \cdot \\ \cdot \\ F_n \end{Bmatrix} \quad (5)$$

$$S = \begin{Bmatrix} S_{11}, & S_{12} & \ldots & S_{1n} \\ S_{21}, & S_{22} & \ldots & S_{2n} \\ \cdot & & & \cdot \\ \cdot & & & \cdot \\ \cdot & & & \cdot \\ S_{n1} & & & S_{nn} \end{Bmatrix}$$

Accordingly, if an inverse matrix of S is expressed by $S^{-1}$, a true T can be expressed by $S^{-1} \cdot F$.

A photometric value measured by a sensor having the same spectral sensitivity distribution as the sensitivity distribution of the copying sensitive material, i.e., a synthetic value Tp, can be expressed as follows:

$$Tp = \left( \sum_{i=1}^{n} Ti \cdot Pi \cdot \Delta Pi \right) / K \quad (6)$$

where $K = \Sigma \Delta Pi/n$, and $\Delta Pi$ is a wavelength width $\lambda_j - \lambda_{j-1}$ at an arbitrary section $[j-1, j]$.

Accordingly, it is possible to estimate the spectral characteristics of an original picture on the basis of the photometric values F1, F2, ... at a time when photometry is effected by separating the light from the original picture into a plurality of separated components, and also on the basis of spectral sensitivity distributions $S_{\lambda 1}$, $S_{\lambda 2}$, ... corresponding to the separated components of the sensor. In addition, it is also possible to obtain a photometric value which is equivalent to a value measured by a sensor having a spectral sensitivity distribution identical with or similar to the spectral sensitivity distribution of the copying sensitive material on the basis of the spectral characteristics of the original picture estimated and the spectral characteristic distribution of the copying sensitive material.

To this end, in accordance with the present invention, values concerning the spectral sensitivity of the sensor and values concerning the spectral sensitivity of the copying sensitive material are stored in advance in the storage means, and photometry is effected by the sensor by separating the light from the original picture into a plurality of separated components. The estimating means estimates the spectral characteristics of the original picture on the basis of the photometric values of the sensor and the values concerning the spectral sensitivity of the sensor, as described above. Then, the controlling means determines a synthetic value which is equivalent to a value measured by a sensor having a spectral sensitivity distribution identical with or similar to the spectral sensitivity distribution of the copying sensitive material, as described above, on the basis of the spectral characteristics of the original picture estimated and the values concerning the spectral sensitivity of the copying sensitive material. The controlling means controls exposure amount on the basis of this synthetic value.

Here, the values concerning the spectral sensitivity of the sensor include the spectral sensitivity distribution of the sensor or a value corresponding thereto, a value concerning the spectral sensitivity of the copying sensitive material, the spectral sensitivity distribution of the copying sensitive material, or a value corresponding thereto.

To separate the light from the original picture into a plurality of separated components, it suffices to use an interference filter having an interference film which is disposed on a transparent substrate and has varying thicknesses at different positions thereof. The interference filter having the interference film can be readily formed by continuously changing the thickness into the configuration of a wedge or discontinuously changing the thickness in the form of steps. In addition, by interposing a film having a low refractive index ($MgF_2$, cryolite, or the like) between two sheets of Ag film, one spectral component ranging from a visible range to a near infrared range can be transmitted through the interference filter depending on the thickness of this film having a low refractive index. If the interference filter having an interference film which is disposed on a transparent substrate and has varying thicknesses at different positions thereof is disposed on a photovoltaic effect type optical sensor such as a MOS, CCD, or the like (hereinafter referred to as the sensor, area sensor, or line sensor), it is possible to photometrically measure a multiplicity of spectral components corresponding to the thickness of the interference film. Accordingly, as compared with a case where a plurality of interference filters having different central wavelengths are combined as in the prior art, the interference filters can be produced at low cost. In addition, since the light is separated by making use of interference, the interference filters can be made compact as compared with prisms for separating the light by making use of refraction. With such interference filters, since the incident light is separated into a multiplicity of spectral components, it is possible to compensate for a shortage of the quantity of light if a plurality of spectral components in predetermined wavelength bands corresponding to the half-widths of the separated components.

As for the spectral sensitivity distributions of copying sensitive materials, particularly photographic color print papers, the configurations of the spectral sensitivity distributions are similar even if the manufacturers, their types, and the like are different. Hence, maximum values of the spectral sensitivities of various color papers exist substantially in an identical wavelength band. Accordingly, if photometry is effected by separating the wavelength band corresponding to that maximum sensitivity wavelength band into at least two, preferably not less than two, separated components, it is possible to easily obtain a synthetic value which is equivalent to a value measured by a sensor having a spectral sensitivity distribution identical with or similar to the spectral sensitivity distribution of one of various copying sensitive materials, particularly various color print papers.

The maximum spectral sensitivities of various color papers exist in the 450–485 nm wavelength band, the 450–560 nm wavelength band, and the 680–710 nm wavelength band, i.e., in the wavelength bands of the three primary colors. Therefore, it is preferable to effect photometry by separating each of these wavelength bands into a plurality of separated components by using the sensor.

In order to separate a wavelength band corresponding to the maximum sensitivity wavelength band into a plurality of separated components, it suffices to use a filter on which an interference film for separating the relevant wavelength band into these separated components is deposed at different positions in an identical plane. In this case, as for the spectrally separating filter, it is possible to use filters that are fabricated for the respective separated components, or it is possible to use a single filter on which all the necessary interference films such as those described above are deposited. In addition, it is possible to use three filters divided for the primary colors of R, G, and B. Furthermore, it is possible to use a filter having a first interference film for separating the light into components having narrow half-widths and a second interference film for separating the light into components having wider half-widths than the above. This arrangement is adopted to effect photometry at high accuracy using narrower intervals with respect to components having narrow half-widths, since the ratio of contribution of a photometric value to exposure amount is large with respect to the wavelength band corresponding to the maximum sensitivity wavelength band, and to effect photometry by using wider intervals with respect to components having wider half-widths than the above, since the ratio of contribution of a photometric value to exposure amount is small with respect to the wavelength band other than the one corresponding to the maximum sensitivity wavelength band. Since the number of separated components obtained is reduced by the use of the above-described filter, this filter can be readily mass produced by using a masking method in which deposition is carried out consecutively by making its portions other than the portion where the interference film is deposited.

In order to estimate the spectral characteristics of the original picture, it is necessary to determine a value peculiar to the sensor on the basis of the spectral sensitivity distribution of the sensor, a peculiar value in which spectral sensitivity distributions of the sensor corresponding to the respect separated components are integrated over very small wavelength sections including the central wavelengths of the separated components may be stored in the storage means instead of the spectral sensitivity distributions of the sensor. In this case, spectral characteristics of the original picture corresponding to the respective very small wavelength sections are estimated on the basis of peculiar values and photometric values of the sensor corresponding to the respective separated components. Then, a synthetic value which is equivalent to a value measured by a sensor having a spectral sensitivity distribution identical with or similar to a spectral sensitivity distribution of the copying sensitive material is determined by integrating the product of the respective spectral characteristics of original picture estimated and the respective spectral sensitivities of the copying sensitive material.

As described above, in accordance with the present invention, exposure amount can be controlled by estimating the spectral characteristics of the original picture even on the basis of photometric values obtained by separating the light into separated components having large half-widths. Hence, it is possible to obtain an advantage in that it is possible to provide a compact exposure controlling apparatus which does not cause a shortage of the quantity of light and is capable of being mass produced with high accuracy and at low cost.

In accordance with one aspect of the present invention, as shown in FIG. 17, the exposure controlling apparatus comprises: a first sensor A for effecting photometry by separating light from an original picture into a multiplicity of spectral components or a multiplicity of separated components and adapted to output a multiplicity of first photometric values corresponding to the multiplicity of spectral components and the multiplicity of separated separated components; a second sensor B having maximum sensitivities in wavelength bands corresponding to three sensitivity bands of a copying sensitive material, and effecting photometry by dividing the original picture into a multiplicity of fragments, the second sensor being adapted to output a multiplicity of second photometric values corresponding the multiplicity of fragments; first calculating means C for calculating a first average image density synthesized by adding weight to each of the multiplicity of first photometric values; second calculating means D for calculating a second average image density by averaging the multiplicity of second photometric values; third calculating means E for calculating a third average image density by averaging the second photometric values belonging to a region whose color ratio or color difference from a reference value on predetermined color coordinates is small; and controlling means F for calculating an exposure amount control value on the basis of the first average image density, the second average image density, and the third average image density, and for controlling the exposure amount on the basis of the exposure amount control value.

The first calculating means may calculate the basic exposure value on the basis of the first average image density obtained by integrating or totalizing $k_\lambda \cdot SP_\lambda \cdot d_\lambda$ over a predetermined wavelength band where $SP_\lambda$ is a first photometric value at a wavelength $\lambda$ of one of the spectral components or one of the separated components, $k_\lambda$ is weight at the wavelength $\lambda$ to be added to the first photometric value, and $d_\lambda$ is a wavelength width of one of the spectral components or one of the separated components.

The second average image density may be a density determined from an arithmetic average value of the multiplicity of second photometric values.

Furthermore, if it is assumed that the first average image density is PD1j, the second average image density is PD2j, and the third average image density is PD3j, the exposure controlling means may calculate the exposure amount control value in accordance with PD1j + F·f(PD3j, PD2j) where j is 1 to 3, respectively representing the three sensitivity wavelength bands of the copying sensitive material, F is a constant or a value expressed by a constant, and f(PD3j, PD2j) is a functional expression comprising the third average image density PD3j and the second average image density PD2j.

In the above formula, an arrangement may be provided such that $$f(PD3j, PD2j) = PD3j - PD2j - \left( \sum_{j=1}^{3} PD3j - \sum_{j=1}^{3} PD2j \right)/3.$$

Referring now to FIG. 17, a description will be given of the operation in accordance with this first aspect of the invention. The first sensor A photometrically measures the original picture by separating the light therefrom into a multiplicity of spectral components or a multiplicity of separated components, and outputs a multiplicity of first photometric values $SP_\lambda$ corresponding to the multiplicity of spectral components or the multiplicity of separated components. Here, $\lambda$ is a number specifying a specific spectral component or separated component. $SP_\lambda$ represents a photometric value at the wavelength number $\lambda$. In addition, the second sensor B has maximum sensitivities in wavelength bands corresponding to three sensitivity wavelength bands of the copying sensitive material, photometrically measures the original picture by dividing it into a multiplicity of segments, and outputs a multiplicity of second photometric values ti corresponding to the multiplicity of segments. This ti represents a photometric value at an i-th fragment. The three sensitivity wavelength bands of the copying sensitive material ordinarily exist in the wavelength bands of red (R) light, green (G) light, and blue (B) light, but wavelength bands other than the above may be used. The first calculating means C calculates a first average image density (synthetic value) synthesized by adding weight $k_\lambda$ to each of the multiplicity of first photometric values $SP_\lambda$. This value is obtained by integrating or totalizing $k_\lambda \cdot SP_\lambda \cdot d_\lambda$ (where $d_\lambda$ is a wavelength width of one of the spectral components or one of the separated components) over a predetermined wavelength band, e.g., wavelength bands corresponding to the three sensitivity wavelength bands of the copying sensitive material. In cases where the first average image density PD1j (where j is one of the three sensitivity wavelength bands of the copying sensitive material, e.g., one of R, G, and B) is determined by addition, this value can be used as a large area transmission density (LATD) which is given by the following formula:

$$PD1j = -\log\left\{\left(\sum_{\lambda=\lambda minj}^{\lambda maxj} k_\lambda j \cdot SP_\lambda j \cdot d_\lambda\right)/KA\right\} \quad (12)$$

where $\lambda$min is a minimum value of the adding section, $\lambda$max is a maximum value thereof, and KA is a constant determined by calibration and is used to adjust to a fixed density (e.g., 0) a photometric value obtained by photometrically measuring a reference film (e.g., a film base portion) or a photometric value measured with no film. This first average image density is used for determining a basic exposure amount.

The second calculating means D calculates a second average image density by averaging the multiplicity of second photometric values PD2j. As for this second photometric value PD2j, it is possible to use, for instance, LATD given by the following formula, i.e., a logarithm of an arithmetic average of the second photometric values:

$$PD2j = -\log\left\{\frac{1}{n}\sum_{i=1}^{n} tij/KB\right\} \quad (13)$$

where n is the number of divisions, and KB is a constant which is determined by calibration in the same way as described above.

The third calculating means E calculates a third average image density by averaging (e.g., arithmetically averaging) the second photometric values belonging to a region whose color ratio or color difference from a reference value on predetermined color coordinates is small. As these color coordinates, it is possible to use two- or three-dimensional color coordinates having as their coordinate axis one color or a combination of two or more colors of the three primaries (e.g., Dx−Dy, Dx/(Dx+Dy+Dz), aDx+bDy+cDz, Dx/K, etc., where x, y, and z respectively represent a mutually different one color selected from among R, G, and B, and a, b, c, and K are constants). In addition, as a reference value, it is possible to adopt such as a value concerning a specific color of the original image, a value obtained from an average value of a multiplicity of images, a minimum value of photometric data, a value obtained from photometric data on a specific image, a predetermined specific constant, and so forth. Furthermore, the reference value may be a value given by a functional expression or a table. In this case, the functional expression or table may be such that a reference value changes depending on, for instance, an image density. It should be notes that as a specific color of the original image, a neutral color, a color of skin, or a color determined from an average value of a multiplicity of images. Each of the second photometric data is converted to a point on the aforementioned color coordinates by calculation, the second photometric values belonging to a region whose color ratio or color difference from the reference value is small are selected, and the selected second photometric values are averaged, thereby calculating the third average image densities PD3j. Thus, it is possible to prevent the occurrence of color failures if the second photometric values belonging to a region whose color difference or color ratio from the reference value is small, i.e., a neutral color region or a region with a low degree of saturation, are used for determination of the exposure control, which will be described below.

The controlling means F calculates an exposure amount control value E on the basis of the first average image density PD1j, the second average image density PD2j, and the third average image density PD3j, and controls the exposure amount of the copying apparatus on the basis of that exposure amount control value. This exposure control value formula:

$$Ej = PD1j + F \cdot f(PD3j, PD2j) \quad (14)$$

where F is a constant (e.g., 1.0) or a value expressed by a function). The first average image density PD1j is used for determining the basic exposure amount, while F·f(PD3j, PD2j) functions as an exposure amount correction value with respect to the basic exposure amount.

The correction value f(PD3j, PD2j) is a functional expression consisting of PD3j and PD2j, and is specifically given, for instance, by the following formula:

$$f(PD3j, PD2j) = PD3j - PD2j - \left(\sum_{j=1}^{3} PD3j - \sum_{j=1}^{3} PD2j\right)/3 \quad (15)$$

where PD3j−PD2j is a color difference between two average image densities, while $$\left(\sum_{j=1}^{3} PD3j - \sum_{j=1}^{3} PD2j\right)/3$$

is a term for correcting the two average image densities.

As described above, in accordance with the one aspect of the invention, since the basic exposure amount is determined on the basis of the first photometric values that are obtained through photometry by dividing the light into a multiplicity of spectral components or separated light and have spectrally high accuracy, the performance of correcting differences in characteristics due to a difference in the film type can be improved. In addition, since the basic exposure amount is corrected by estimating the color of the object, it is possible to obtain the advantage that correction corresponding to the contents of the image, i.e., the correction of color failures, can be effected without undermining the film type-correcting performance. In addition, since the basic exposure amount is determined by synthesizing the first photometric values, an advantage can be obtained in that it is possible to overcome a shortage of the sensitivity of the sensor at a time when the light is separated into the multiplicity of spectral components or separated components.

In accordance with a second aspect of the invention, the exposure controlling apparatus comprises: a first sensor for effecting photometry by separating light from an original picture into a multiplicity of spectral components, the first sensor including an interference filter which is provided with an interference film disposed on a transparent substrate and having varying thicknesses at different positions thereof, the interference filter being adapted to separate the light from the original picture into the multiplicity of components having central wavelengths corresponding to the thicknesses of the interference film; a second sensor for photometrically measuring red, green, and blue light by dividing the original picture into a multiplicity of fragments; and controlling means for determining a basic exposure amount on the basis of a synthetic value determined at least from spectral photometric values of the first sensor, and for controlling an exposure amount on the basis of the basic exposure amount.

The controlling means in this aspect of the invention may determine the basic exposure amount on the basis of the synthetic value determined from the spectral photometric values of the first sensor, or determine the basic exposure amount on the basis of a color control value determined on the basis of the synthetic value determined from the spectral photometric values of the first sensor and of a density control value determined on the basis of photometric values of the second sensor, and control the exposure amount on the basis of the basic exposure amount.

The controlling means may further determine a correction value corresponding to the contents of an image of the original picture on the basis of the photometric values of the second sensor, and control the exposure amount by means of a value in which the basic exposure amount is corrected by the correction value.

It is preferred that the first sensor is provided with a transmitted light quantity controlling layer, or a pixel area of the first sensor is changed, whereby the sensitivity of the first sensor to a long wave band is lowered relative to its sensitivity to a short wave band. In addition, at that juncture, the first sensor is preferably arranged to lower the sensitivity with respect to a 500-600 nm wavelength band to $\frac{1}{2}$ to 1/5, and the sensitivity with respect to a 600-750 nm wavelength band to $\frac{1}{4}$ to 1/20.

In this second aspect of the invention, the first sensor has an interference filter which is provided with an interference film disposed on a transparent substrate and having varying thicknesses at different positions thereof, the interference filter being adapted to separate the light from the original picture into the multiplicity of components having central wavelengths corresponding to the thicknesses of the interference film. The interference filter having the interference film can be readily formed by continuously changing the thickness into the configuration of a wedge or discontinuously changing the thickness in the form of steps. In addition, by interposing a film having a low refractive index ($MgF_2$, cryolite, or the like) between two sheets of Ag film, one spectral component ranging from a visible range to a near infrared range can be transmitted through the interference filter depending on the thickness of this film having a low refractive index. If the interference filter having an interference film disposed on a transparent substrate and having varying thicknesses at different positions thereof is disposed on a photovoltaic effect-type optical sensor such as a MOS, CCD, or the like (hereinafter referred to as the sensor, area sensor, or line sensor), it is possible to photometrically measure a multiplicity of spectral components corresponding to the thickness of the interference film. Accordingly, as compared with a case where a plurality of interference filters having different central wavelengths are combined as in the prior art, the interference filters can be produced at low cost. Then, the first sensor photometrically measures the original picture by separating the light transmitted therethrough or the light reflected therefrom into multiplicity of spectral components. Weight which is determined in correspondence with the relative spectral sensitivity distribution of the copying sensitive material is added to the spectral photometric values of the first sensor. Thus, by adding weight to the spectral photometric values, it is possible to make the spectral sensitivity distribution of the first sensor and the spectral sensitivity distribution of the copying sensitive material agree with each other. Accordingly, the controlling means is capable of determining the basic exposure amount on the basis of the photometric values of the first sensor and of controlling the exposure amount by using this basic exposure amount.

The second sensor effects photometry with respect to R, G, and B light by dividing the original picture into a multiplicity of fragments. Since the first sensor effects photometry by dividing the light into a multiplicity of spectral components, it is possible to determine a color control value on the basis of a synthetic value determined from the spectral photometric values of the first sensor. The spectral sensitivity distribution of the second sensor is not necessarily agree accurately with the spectral sensitivity distribution of the copying sensitive material. For this reason, an arrangement may be provided such that the basic exposure amount is determined on the basis of a color control value determined from a synthetic value determined from the spectral photometric values of the first sensor and a density control value determined from the photometric values of the second sensor.

In addition, since the second sensor effects photometry by dividing the original picture into a multiplicity of fragments, it is possible to determine a correction value corresponding to the contents of the image of the original picture by performing predetermined calculation on the basis of a characteristic amount of the image obtained from the photometric values (it is possible to use the techniques disclosed in Japanese Patent Laid-Open Nos. 28131/1979, 38410/1980, and 3133/1986) and by selecting necessary photometric values (it is possible to use the techniques disclosed in Japanese Patent Laid-Open Nos. 189457/1987 and 198144/1986), and the aforementioned basic exposure amount may be corrected with a correction value.

The lamps that are ordinarily used as exposing light sources emit a small quantity of light in the short wave band, and the sensors also exhibit low sensitivity to the short wave band. Accordingly, when a halogen lamp is used as a light source, it is necessary to lower the sensitivity of the first sensor with respect to the long wave band relative to its sensitivity to the short wave band. In order to alter the sensitivity, it suffices to provide a transmitted light-quantity controlling layer (interference film or filter) or use a sensitivity lowering means for changing the pixel area of the sensor. Specifically, to lower the sensitivity, it suffices to lower the sensitivity with respect to a 500-600 nm wavelength band to ½ to 1/5, and the sensitivity with respect to a 600-750 nm wavelength band to ¼ to 1/20.

Thus, in accordance with the second aspect of the invention, since an interference filter which is provided with an interference film disposed on a transparent substrate and having varying thicknesses at different positions thereof is used, advantages can be obtained in that mass production is facilitated as compared with the case where a multiplicity of interference filters having different central wavelengths are combined, and in that, in in coping with a change in the spectral sensitivity distribution due to the change of the copying sensitive material, it suffices to merely change the weight value of spectral photometric values without needing to replace the filter. Furthermore, the present invention offers an advantage in that the apparatus can be made compact and produced at low cost since no prism is used.

In addition, in accordance with this aspect of the invention, it is possible to obtain an advantage in that a sufficient quantity of light can be secured if the sensitivity is changed in correspondence with a wavelength band.

Furthermore, in accordance with this aspect of the invention, since the basic exposure amount based on the average density of the picture is determined by the first sensor, and the exposure correction amount is determined by photometrically measuring the light from the picture by dividing the picture into a multiplicity of fragments, the spectral sensitivity distribution of the second sensor need not necessarily be made to coincide with the spectral sensitivity distribution of the copying sensitive material.

In addition, in accordance with a third aspect of the invention, the exposure controlling apparatus comprises: a first sensor for photometrically measuring an original picture by separating a wavelength band, corresponding to a maximum sensitivity wavelength band of a copying sensitive material for copying an image of the original picture thereon, into a multiplicity of separated components; a second sensor for photometrically measuring red, green, and blue light by dividing the original picture into a multiplicity of fragments; calculating means for calculating a synthetic value which is equivalent to a value measured by a sensor having a spectral sensitivity distribution identical with or similar to a spectral sensitivity distribution of the copying sensitive material for copying by adding weight to photometric values of the first sensor; and controlling means for determining a basic exposure amount on the basis of at least the synthetic value determined by the calculating means, and for controlling an exposure amount on the basis of the basic exposure amount. This control means may be arranged to calculate the basic exposure amount on the basis of the synthetic value determined by the calculating means, or determine the basic exposure amount on the basis of a color control value determined from the synthetic value determined by the calculating means and also on the basis of a density control value determined from photometric values of the second sensor, and control an exposure amount on the basis of the basic exposure amount.

The wavelength band corresponding to the maximum sensitivity wavelength band preferably includes a 450–485 nm wavelength band, a 540–560 nm wavelength band, and a 680–710 nm wavelength band.

The first sensor may comprise a filter on which an interference film for separating a wavelength band corresponding to at least one maximum sensitivity wavelength band into a plurality of separated components is deposited at different positions in an identical plane.

In addition, the first sensor may comprise a filter on which are deposited a first interference film for separating a wavelength band corresponding to a maximum sensitivity wavelength band into a plurality of separated components and a second interference film for separating a wavelength band other than the wavelength band corresponding to the maximum sensitivity wavelength band into a plurality of separated components having a half-width wider than that of the first interference film.

The first sensor may comprise a filter on which are deposited a first interference film for separating a wavelength band corresponding to a maximum sensitivity wavelength band into a plurality of separated components at at intervals of a narrow wavelength and a second interference film for separating a wavelength band other than the wavelength band corresponding to the maximum sensitivity wavelength band into a plurality of separated components at intervals of a wider wavelength than the intervals of the wavelength.

In the third aspect of the invention, the first sensor photometrically measures the original picture by separating a wavelength band, corresponding to a maximum sensitivity wavelength band of the copying sensitive material for copying an image of the original picture thereon, into a multiplicity of separated components. As for the spectral sensitivity distributions of copying sensitive materials, particularly photographic color print papers, the configurations of the spectral sensitivity distributions are similar even if the manufacturers, their types, and the like are different. Hence, maximum values of the spectral sensitivities of various color papers exist substantially in an identical wavelength band. Accordingly, if photometry is effected by separating the wavelength band corresponding to that maximum sensitivity wavelength band into at least two, preferably not less than two, separated components, and weight is added to each of the photometric values, then it is possible to easily obtain a synthetic value which is equivalent to a value measured by a sensor having a spectral sensitivity distribution identical with or similar to the spectral sensitivity distribution of one of various copying sensitive materials, particularly various color print papers. As for this weight, it is possible to use a value obtained from the spectral sensitivity distribution or the like of the sensor. Even if the spectral sensitivity distribution of the first sensor is offset from the spectral sensitivity distribution of the copying sensitive material, it is possible to obtain the aforementioned synthetic value by changing the weight. For this reason, the calculating means adds weight to the photometric values of the first sensor, to thereby calculate a synthetic value which is equivalent to a value measured by a sensor having a spectral sensitivity distribution identical with or similar to a spectral sensitivity distribution of the copying sensitive material.

Thus, by adding weight to the photometric values of the first sensor, the spectral sensitivity distribution of the first sensor can be made to agree with or approximate the spectral sensitivity distribution of the copying sensitive material, so that the controlling is capable of determining the basic exposure amount on the basis of at least the synthetic value determined by the calculating means, and controlling the exposure amount on the basis of this basic exposure amount.

The second sensor effects photometry with respect to R, G, and B light by dividing the original picture into a multiplicity of fragments. Since the first sensor effects photometry by separating the light into a plurality of separated components, the first sensor is capable of determining a color control value on the basis of the synthetic value determined by the calculating means. The spectral sensitivity distribution of the second sensor need not necessarily agree accurately with the spectral sensitivity distribution of the copying sensitive material. For this reason, the basic exposure amount may be determined on the basis of the color control value determined from the synthetic value obtained from the photometric values of the first sensor and also on the basis of the density control value determined from the photometric values of the second sensor.

Furthermore, since the second sensor effects photometry by dividing the original picture into a multiplicity of fragments, it is possible to determine a correction value corresponding to the contents of the image of the original picture by performing predetermined calculation on the basis of a characteristic amount of the image obtained from the photometric values (it is possible to use the techniques disclosed in Japanese Patent Laid-Open Nos. 28131/1979, 38410/1980, and 3133/1986) and by selecting necessary photometric values (it is possible to use the techniques disclosed in Japanese Patent Laid-Open Nos. 189457/1987 and 198144/1986), and the aforementioned basic exposure amount may be corrected with a correction value.

The maximum spectral sensitivities of various color papers exist in the 450–485 nm wavelength band, the 540–560 nm wavelength band, and the 680–710 nm wavelength band, i.e., in the wavelength bands of the three primary colors. Therefore, it is preferable to effect photometry by separating each of these wavelength bands into a plurality of separated components by using the first sensor.

In order to separate a maximum sensitivity wavelength band into a plurality of separated components, it suffices to use a filter on which an interference film for separating the relevant wavelength band into these separated components is deposed at different positions in an identical plane. In this case, as for the spectrally separating filter, it is possible to use filters that are fabricated for the respective separated components, or it is possible to use a single filter in which all the necessary interference films are deposited on a single substrate.

Furthermore, it is possible to use a filter having a first interference film for separating the light into components having narrow half-widths and a second interference film for separating the light into components having wider half-widths than the above. This arrangement is adopted to effect photometry at high accuracy using narrower intervals with respect to components having narrow half widths, since the ratio of contribution of a photometric value to exposure amount is large with respect to the wavelength band corresponding to the maximum sensitivity wavelength band, and is also adopted to effect photometry by using wider intervals with respect to components having wider half-widths than the above, since the ratio of contribution of a photometric value to exposure amount is small with respect to the wavelength band other than the one corresponding to the maximum sensitivity wavelength band. Since the filters used for the first sensor effect photometry with high accuracy only with respect to necessary wavelength bands, and the number of separated components is thereby reduced, this filter can be readily mass produced by using a masking method in which deposition is carried out consecutively by making its portions other than the portion where the interference film is deposited.

As described above, in accordance with the third aspect of the invention, wavelength bands corresponding to the maximum sensitivity wavelength bands of the copying sensitive material are separated into a plurality of separated components so as to effect photometry with high accuracy. As a result, it is possible to obtain an advantage in that the number of separated components can be reduced as compared with the prior art, thereby making it unnecessary to use a special filter, prism or the like for separating the light into a multiplicity of spectral components, and making it possible to provide a compact exposure controlling apparatus capable of being easily mass produced at low cost. In addition, weight is added to the photometric values of the first sensor so as to obtain photometric values which are equivalent to those measured by a sensor having a spectral sensitivity distribution identical with or similar to a spectral sensitivity distribution of the copying sensitive material. Accordingly, an advantage can be obtained in that alteration of the weight prevents the degree of agreement of spectral sensitivity distributions and the versatility of the apparatus from being lowered, and makes it possible to cope with variations in production.

BRIEF DESCRIPTION OF THE DRAWINGS

FIG. 19 is a chart showing on color coordinates average densities obtained by photometrically measuring a film image in which a standard object was photographed on four types of negative film, A, B, C, and D, by consecutively changing the exposure amount;

FIG. 20 is a chart showing on color coordinates image densities in which mask densities are subtracted from the average densities shown in FIG. 19;

DESCRIPTION OF THE PREFERRED EMBODIMENTS

Figure 1:
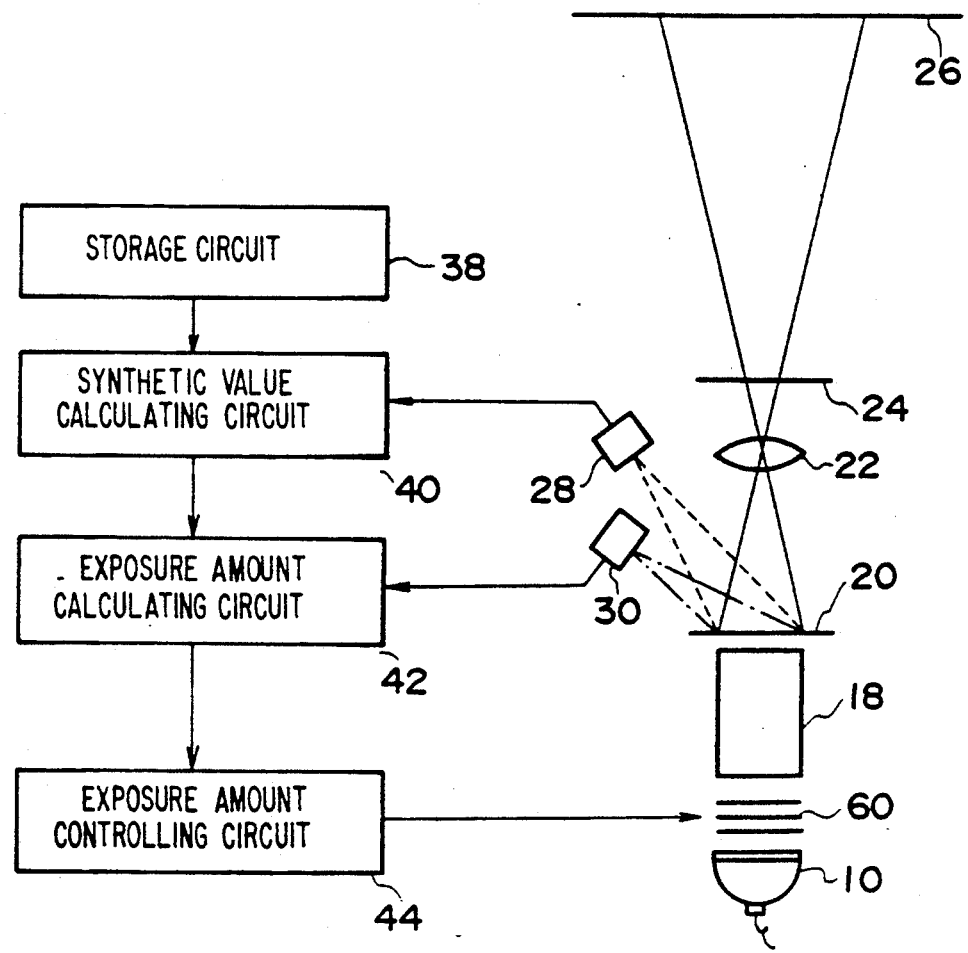
FIG. 1 is a diagram schematically illustrating an embodiment of a color photographic printer to which the present invention is applicable.

Referring now to the accompanying drawings, a detailed description will be made of a first embodiment of the present invention. In this embodiment, the present invention is applied to a color photographic printer. As shown in FIG. 1, a mirror box 18 and a lamp house 10 having a halogen lamp are arranged below a negative film 20 which has been conveyed to a printing section by being loaded on a negative carrier. A light-adjusting filter 60 is interposed between the mirror box 18 and the lamp house 10. The light adjusting filter 60 comprises three filters, a yellow (Y) filter, a magenta (M) filter, and a cyan (C) filter in a conventional manner.

A lens 22, a black shutter 24, and a color paper 26 are arranged in order above the negative film 20. The arrangement is such that a beam of light which is applied from the lamp house 10 and is transmitted through the light-adjusting filter 60, the mirror box 18, and the negative film 20 forms an image on the color paper 26 by means of the lens 22.

A first sensor 28 and a second sensor 30 are disposed in a direction inclined with respect to the optical axis of the above-described image-forming optical system and at a position where the image density of the negative film 20 can be photometrically measured.

The first sensor 28 is connected to an exposure amount calculating circuit 42 via a synthetic value calculating circuit 40, while the second sensor 30 is directly connected to the exposure amount calculating circuit 42. Connected to a storage circuit 38 in which the above-described peculiar value and the spectral sensitivity of the copying sensitive material are stored. An exposure amount controlling circuit 44 calculates exposure control amount on the basis of an output of the exposure amount calculating circuit 42 so as to control the light-adjusting filter 60.

Figure 2A:
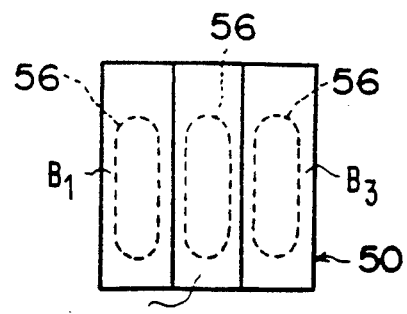
FIGS. 2A to 2D are plan views illustrating filters used in a sensor in accordance with this embodiment.
Figure 2B:
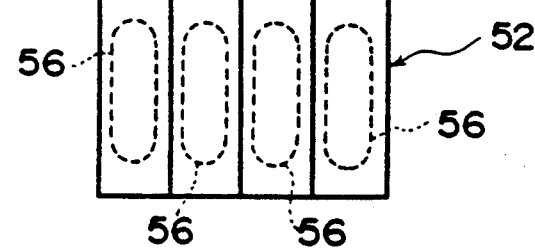
Figure 2C:
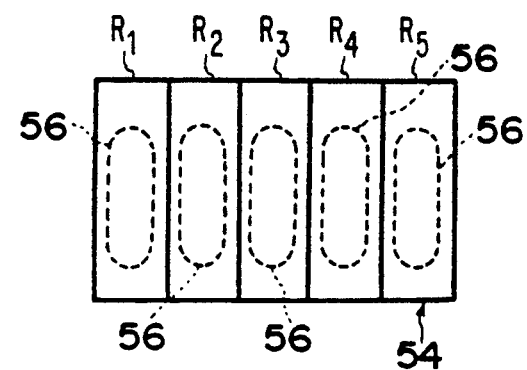
Figure 3A:
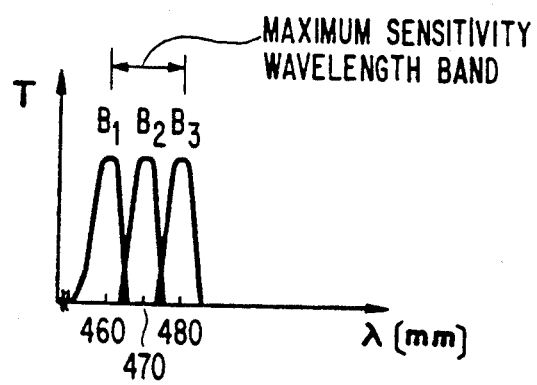
FIGS. 3A to 3C are diagrams respectively illustrating the spectral transmittance distribution of the sensors shown in FIGS. 2A to 2C.
Figure 3B:
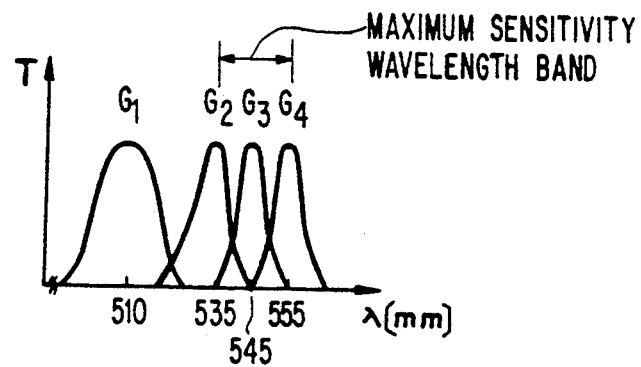

The first sensor 28 has on a light beam-incident side thereof a filter 50 for B light, a filter 52 for G light, and a filter 54 for R light, respectively shown in FIGS. 2A, 2B and 2C, for separating the light in respective maximum sensitivity wavelength bands of the color paper into a plurality of separated components. The filter 50 for B light is adapted to separate the light in a wavelength band of 450–485 nm corresponding to the B light maximum sensitivity wavelength band of the color paper into three separated components. The filter 50 has the following interference filters: an interference film $B_1$ for separating the light into a component whose central wavelength in the spectral transmittance distribution is $460 \pm 5$ nm, an interference film $B_2$ for separating the light into a component whose central wavelength in the spectral transmittance distribution is $470 \pm 5$ nm, and an interference film $B_3$ for separating the light into a component whose central wavelength in the spectral transmittance distribution is $480 \pm 5$ nm. These interference films $B_1$, $B_2$, $B_3$ are deposited on a glass substrate in such a manner as to be disposed adjacent to each other. Photoelectric conversion devices 56 are respectively disposed on the light beam-transmitting sides of the interference films $B_1$, $B_2$, $B_3$. It should be noted that, in terms of the spectral transmittance distribution of the filter 50 for B light, the interference films may have the same half-width, as shown in FIG. 3A, or may not have the same half-width, and the spectral transmittance distributions of the adjacent separated components may overlap in predetermined wavelength bands, as shown in FIG. 3B.

The filter 52 for G light is adapted to separate the light mainly in a wavelength band of 540–560 nm corresponding to the G light maximum sensitivity wavelength band of the color paper into two separated components. The filter 52 has an interference film $G_3$ for separating the light into a component whose central wavelength in the spectral transmittance distribution is $545 \pm 5$ nm as well as an interference film $G_4$ for separating the light into a component whose central wavelength in the spectral transmittance distribution is 555±5 nm, the interference films $G_3$ and $G_4$ being deposited on a glass substrate in such a manner as to be disposed adjacent to each other. In addition, an interference film $G_2$ for separating the light into a component whose central wavelength in the spectral transmittance distribution is 535±5 nm is disposed adjacent to the interference film $G_3$, while an interference film $G_1$ for separating the light into a component whose central wavelength in the spectral transmittance distribution is 510±5 nm is disposed adjacent to the interference film $G_2$. The photoelectric conversion devices 56 are respectively disposed on the light beam-transmitting sides of the interference films $G_1$, $G_2$, $G_3$, $G_4$. It should be noted that the half-widths of the interference films $G_1$, $G_2$ may be greater than those of the interference films $G_3$, $G_4$, as shown in the spectral transmittance distribution of the filter 52 for G light shown in FIG. 3B. In addition, in this filter as well, the spectral transmittance distributions of the separated components may overlap in predetermined wavelength bands.

Figure 3C:
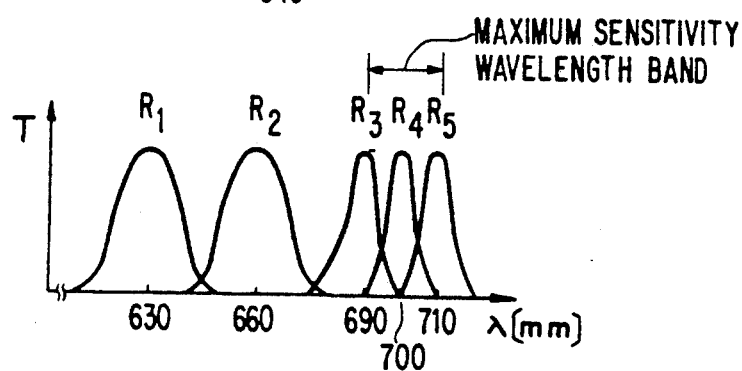

The filter 54 for R light is adapted to separate the light mainly in a wavelength band of 680-710 nm corresponding to the R light maximum sensitivity wavelength band of the color paper into three separated components. The filter 54 has the following interference films: an interference film $R_3$ for separating the light into a component whose central wavelength in the spectral transmittance distribution is 690±5 nm, an interference film $R_4$ for separating the light into a component whose central wavelength in the spectral transmittance distribution is 700±5 nm, and an interference film $R_5$ for separating the light into a component whose central wavelength in the spectral transmittance distribution is 710 ±5 nm. These interference films $G_3$ and $G_4$ are deposited on a glass substrate in such a manner as to be disposed adjacent to each other. In addition, an interference film $R_1$ for separating the light into a component whose central wavelength in the spectral transmittance distribution is 630 ±5 nm and an interference film $R_2$ for separating the light into a component whose central wavelength in the spectral transmittance distribution is 660+5 nm are disposed adjacent to the interference film $R_3$. The photoelectric conversion devices 56 are respectively disposed on the light beam-transmitting sides of the interference films $R_1$, $R_2$, $R_3$, $R_4$, $R_5$ in the same way as the filter 50 for B light and the filter 52 for G light. It should be noted that the half-widths of the interference films $R_1$, $R_2$ may be greater than those of the interference films $R_3$, $R_4$, $R_5$, as shown in the spectral transmittance distribution of the filter 54 for R light shown in FIG. 3C.

The filter 50 for B light may be fabricated in the following manner: The interference film B1 is first deposited in a state in which the portions to be deposited with the interference films B2, B3 are masked. The interference film B2 is then deposited in a state in which the portion deposited with the interference film B1 and the portion to be deposited with the interference film B3 are masked. The interference film B3 is finally deposited in a state in which the portions deposited with the interference films B1, B2 are masked. Incidentally, both the filter 52 for G light and the filter 54 for R light may be fabricated in the same procedure as that for the filter 50 for B light.

Figure 4:
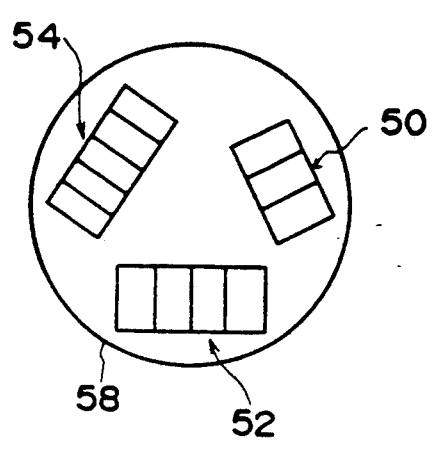
FIG. 4 is a plan view illustrating a state in which the filters are mounted.
Figure 5:
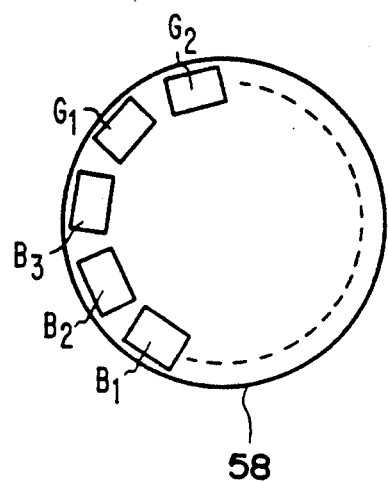
FIG. 5 is a plan view illustrating another example in which the filters are mounted.

In addition, as shown in FIG. 4, the first sensor 28 is arranged such that the filter 50 for B light, the filter 52 for G light, and the filter 54 for R light are arranged on a rotatable disk 58 along the peripheral direction thereof. Alternatively, the first sensor 28 may be arranged such that each of the filters 50, 52, 54 is divided into a plurality of filter pieces with one interference film as a unit, and these filter pieces are arranged along the peripheral direction of the disk 58, as shown in FIG. 5.

Figure 6A:
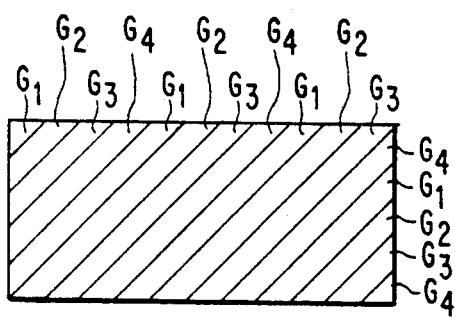
FIGS. 6A to 6C are plan views illustrating examples of arrangement of one of the filters used in the sensor of this embodiment.
Figure 6B:
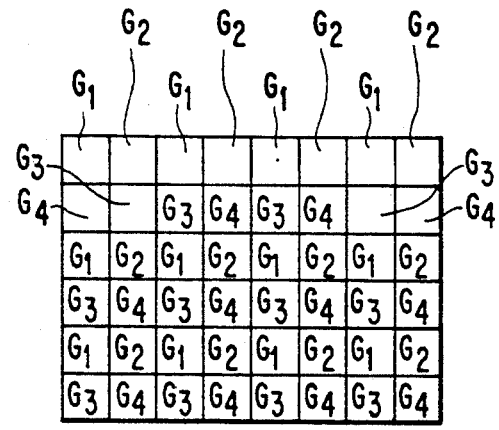
Figure 6C:
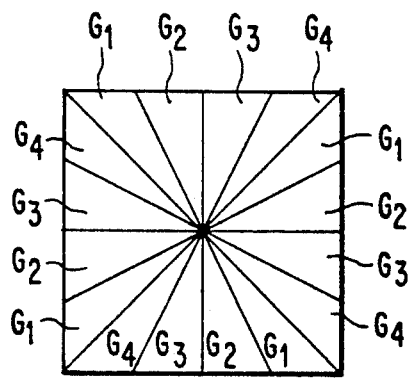
Figure 7A:
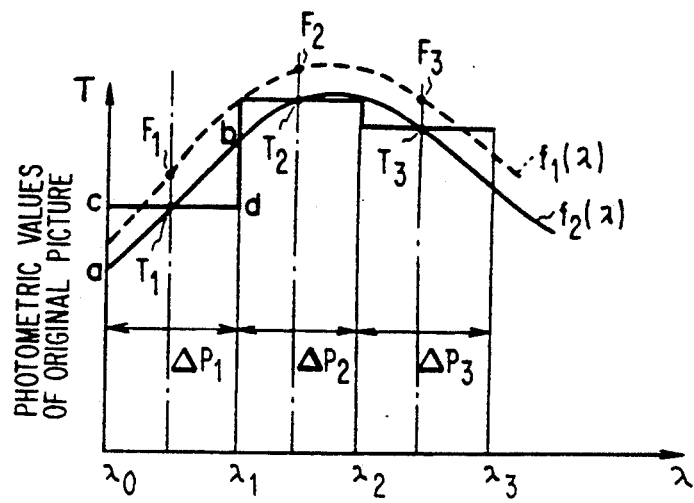
FIGS. 7A to 7C are diagrams illustrating the basic principle of calculating a synthetic value.
Figure 7B:
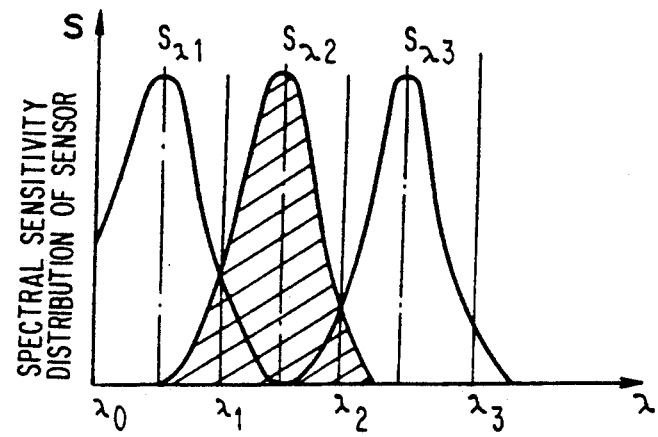
Figure 7C:
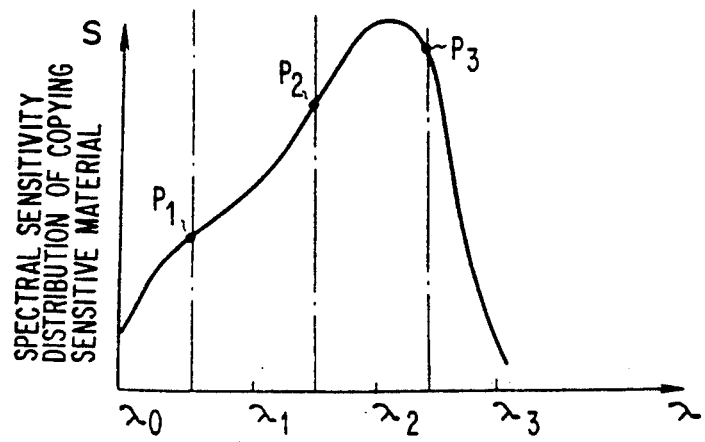

Although in the foregoing examples the filter is arranged in such a manner that each of the interference films corresponds to one separated component, the filter may be alternatively arranged such that a plurality of interference films correspond to one separated component. FIGS. 6A to 6C show examples of the filter for G light thus arranged. FIG. 6A illustrates an example in which the interference films G1 to G4 are arranged in a striped configuration; FIG. 6B shows an example in which the interference films G1 to G4 are arranged in a mosaic configuration; and FIG. 6C shows an example in which the interference films G1 to G4 are arranged in a radial configuration. A two-dimensional image sensor such as a CCD, which has a multiplicity of photoelectric conversion elements, is provided on the light beam-emergent sides of these filters. Such filters are capable of photometrically measuring the original picture of the film uniformly since a plurality of interference films correspond to one separated component. It should be noted that, in this case, it is necessary to effect calibration by such as setting a sensor output corresponding to the base density of the negative film to a reference value 0.0 prior to photometry.

Figure 2D:
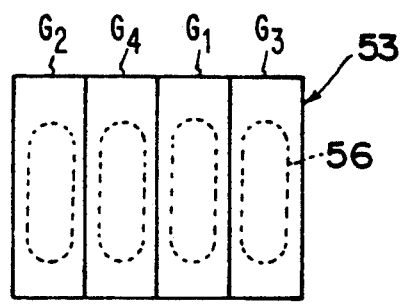

Furthermore, in the foregoing embodiment, in cases where there is a wavelength band in which adjacent ones of separated components overlap each other, the filters allowing the adjacent separated components to be transmitted therethrough are preferably not disposed at adjacent positions so as to prevent the leakage of the respective components. For instance, by arranging the interference film G3 and the interference film G4 in such a manner as not to be adjacent to each other as in the case of the filter for G light shown in FIG. 2D, the light which has been transmitted through the interference film G3 can be prevented from mixing in the light light which has been transmitted through the interference film G4.

The second sensor 30 comprises a tricolor separation filter and a two-dimensional image sensor, and is adapted to photometrically measure the R, G, and B light by dividing the image of the negative film 20 into a multiplicity of fragments. Here, the light in the range of 600-750 nm can be adopted as the R light; the light in the range of 500-600 nm, as the G light; and the light in the range of 400-500 nm, as the B light. The aforementioned maximum sensitivity wavelength bands are included in these ranges.

In the case of the sensor having the filters shown in FIGS. 2A to 2C, the following are stored in the storage circuit 38: peculiar values $S_{11}$, $S_{21}$, $S_{31}$, ... obtained by integrating spectral sensitivity distributions $S_{\lambda 1}$, $S_{\lambda 2}$, ... of the respective photoelectric conversion elements with respect to λ with integral sections set as being identical to small sections, as well as spectral sensitivities $P_1$, $P_2$, $P_3$, ... of the copying sensitive material. It should be noted that, instead of the aforementioned peculiar values, the spectral sensitivity distributions of the respective regions of the sensors may be stored and, instead of the aforementioned spectral sensitivities of the copying sensitive material, the spectral sensitivity distributions per se may be stored.

Figure 8:
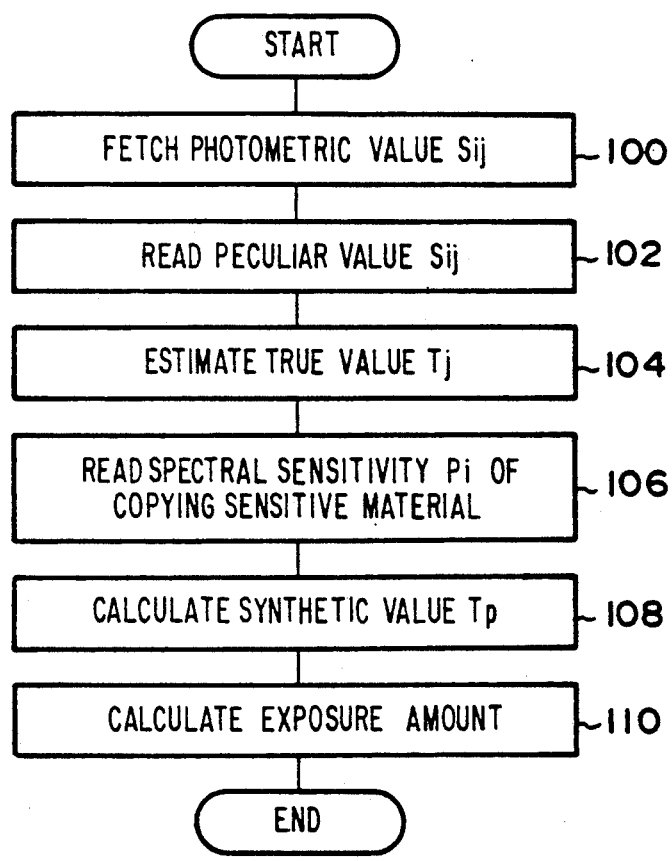
FIG. 8 is a flowchart illustrating a routine of calculation in accordance with the aforementioned embodiment.

FIG. 8 illustrates a routine of calculation by the synthetic value calculating circuit 40 and the exposure amount calculating circuit 42. In Step 100, photometric values Fi corresponding to the respective photoelectric conversion elements and photometrically measured by the first sensor 28 are fetched. In Step 102, peculiar values Sij stored in the storage circuit 38 are read. In an ensuing Step 104, true values Ti are estimated by using the photometric values F1 and the peculiar values Sij, as described above. In an ensuing Step 106, the spectral sensitivities Pi of the copying sensitive material are read from the storage circuit 38, and, in Step 108, the synthetic values Tp are calculated on the basis of the aforementioned Formula (6). In Step 110, a basic exposure amount Dp is calculated in accordance with the following formula by assuming the synthetic values Tp as Tr, Tg, Tb, and average photometric values of the picture of the second sensor as mr, mg, mb:

$$DP = (mr + mg + mb)/3 + Tp - (Tr + Tg + Tb)/3 \quad (7)$$

where r, g, and b represents red, green, and blue color, respectively, and p is one of r, g, and b.

Formula (7) effects color control by the first sensor and density control by the second sensor. Specifically, the difference in color of the first sensor is added to the tricolor average density of the second sensor. The correction value of the basic exposure amount for correction by the second sensor may be obtained by determining a correction value of density with respect to the tricolor average density of the second sensor and color correction values with respect to mr, mg, mb of the second sensor and by adding the same to the basic exposure amount Dp. It goes without saying that, in order to increase the accuracy of calculation of these values, the spectral sensitivity distribution of the second sensor is closer to that of the copying sensitive material.

It should be noted that the basic exposure amount Dp may be calculated in accordance with the following Formulae (8), (9), and (10).

$$Dp = (mr + mg + mb)/3 + (Tp - Tg) \quad (8)$$

$$Dp = mg + (Tp - Tg) \quad (9)$$

$$Dp = Tp \quad (10)$$

The exposure amount controlling circuit 44 controls exposure amount by controlling the light-adjusting filter in accordance with the basic exposure amount Dp.

Specifically, in order to correct the density based on the photographed scene, color failures and the like, the correction amount is calculated on the basis of the photometric value of the second sensor, and exposure amount is controlled by setting as an exposure control value a value in which that correction value is added to the basic exposure amount. The method of calculating the correction amount and the method of controlling exposure amount are disclosed in detail in Japanese Patent Laid-Open Nos. 311241/1988 and 311242/1988.

As described above, in accordance with this embodiment, it is possible to obtain an advantage in that, as disclosed in Japanese Patent Laid-Open No. 311241/1988, the types of film having different film characteristics can be printed under the same printing conditions, and prints of higher quality than conventional prints can be produced from various types of film. In addition, if this embodiment is applied to a color copying machine, original pictures having different spectral sensitivity distributions (photographic original pictures, printing original pictures, illustrations, solid bodies, etc.) can be copied under the same copying conditions.

Although in the above-described embodiment the basic exposure amount Dp is expressed such as in Formulae (7) to (10), a value in which a characteristic amount of the image (e.g., a maximum density, a minimum density, a partial area density, or the like) determined from the photometric values of the second sensor is added may be set as the basic exposure amount. In addition, exposure control may be carried out such that by preparing a correction formula (or conversion table) of the photometric values of the second sensor on the basis of the relationships of correspondence between the photometric values of the first and second sensors, the photometric values of the second sensor are converted to values approximate to those of the first sensor, and exposure amount is determined on the basis of the converted values. Alternatively, the exposure amount determined by the second sensor may be corrected by the photometric values determined by the first sensor. In this case, the difference between the basis exposure amounts determined from the first and second photometric values may be set as a correction value.

In addition, although a description has been given of an example in which peculiar values are stored in the storage circuit, an arrangement may be alternatively provided such that the spectral sensitivity distributions of the respective regions of the sensors are stored in advance, and peculiar values are determined through calculation.

Figure 9:
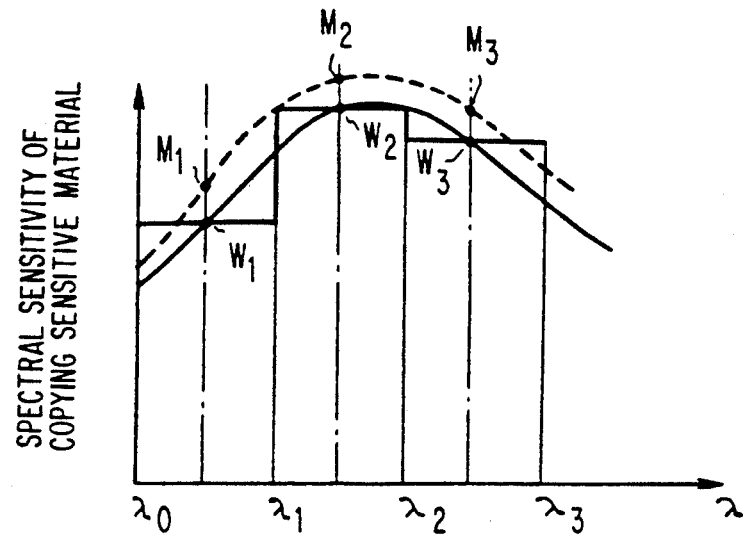
FIGS. 9A and 9B are diagrams illustrating another example of calculating a synthetic value.
Figure 9:
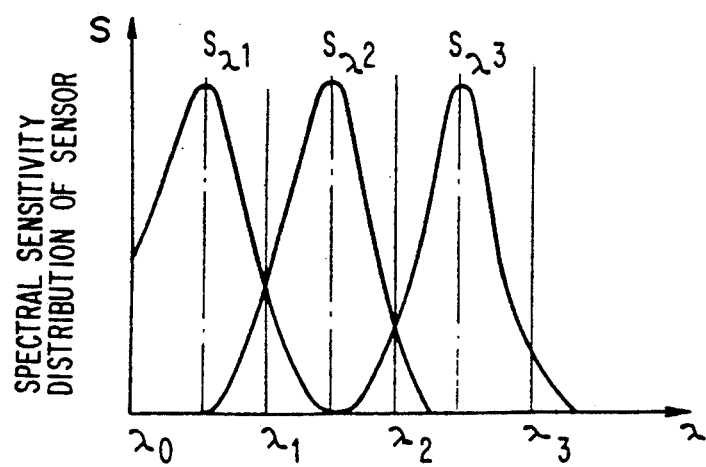

Furthermore, although in the above a description has been given of an example in which the spectral sensitivity distribution of an original picture is estimated on the basis of the photometric values and of the weight determined from the spectral sensitivity distributions of the sensors, it is possible to estimate the weight. In other words, as shown in FIGS. 9A and 9B, if it is assumed that the spectral sensitivity distributions of the respective regions of the sensors are $S_{\lambda 1}$, $S_{\lambda 2}$, $S_{\lambda 3}$, that weights to be added to these spectral sensitivity distributions are $W_1$, $W_2$, $W_3$, the spectral sensitivities to be determined, i.e., the spectral sensitivities of the copying sensitive material, are $M_1$, $M_2$, $M_3$, and if they are expressed as a matrix, they can be expressed as M=W·S. Hence, the weight can be expressed as follows:

$$W = S^{-1} \cdot M \quad (11)$$

Accordingly, if the spectral sensitivity distributions of the respective regions of the sensors and the spectral sensitivity distribution of the copying sensitive material are stored in advance in the storage circuit, and the calculation of Formula (11) above is carried out, it is possible to determine from the photometric values of the sensors the weight W for estimating a photometric value equivalent to a value measured by a sensor having a spectral sensitivity distribution identical with or similar to the spectral sensitivity distribution of the copying sensitive material. Then, if the photometric values of the first sensor 28 are multiplied by the aforementioned weight and are integrated with respect to the wavelength, it is possible to obtain the synthetic value Tp.

Furthermore, although in the above a description has been given of a printer in which a photometric portion and a light-receiving portion are located in the same position, it is possible to employ a printer in which the photometric portion and the exposure portion are separated from each other. The second sensor may be a line sensor. Furthermore, an applicable printer is not restricted to the one shown in FIG. 1, and the present invention is readily applicable to a printer of the type in which scanning is effected by driving the film.

Figure 10:
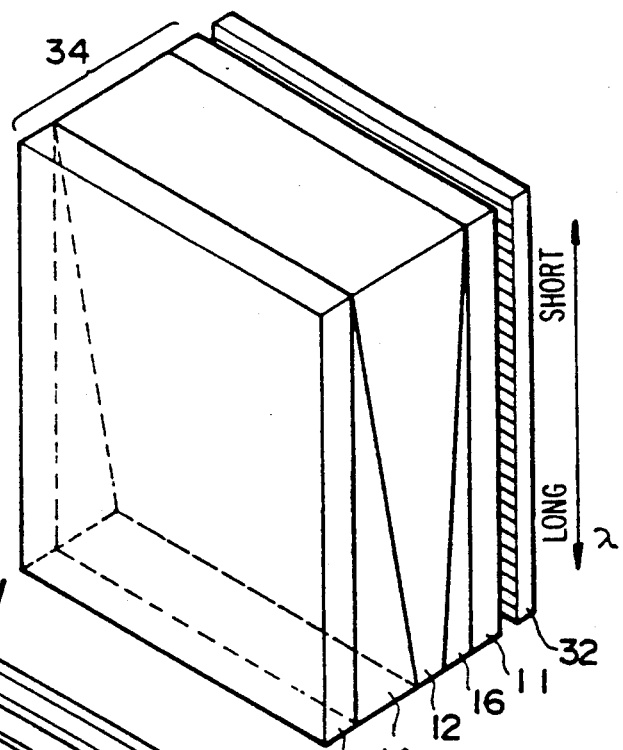
FIGS. 10 to 15 are diagrams illustrating other examples of a first sensor.

Next, a description will be given of examples of the first sensor which can be used in the present invention. A first example of the first sensor 28 comprises a two dimensional image sensor 32 and a metal interference filter 34, as shown in FIG. 10. The two-dimensional image sensor 32 is so constructed as to have a pixel density in which a unit wavelength is set as one pixel. As the unit wavelength, a value in the range of 2–40 nm; e.g., 5–30 nm, is preferable. The interference films are preferably arranged such that they each of them is formed into a wedge shaped configuration so that its thickness changes continuously. The metal interference filter 34 is arranged such that a thin film 12 of magnesium fluoride $MgF_2$ whose thickness is changed into the wedge-shaped configuration is formed on a thin film 16 of silver Ag deposited on a transparent substrate 11, and a thin film 14 of silver Ag is further deposited thereon. Thicknesses of the thin films 14, 16 may be fixed. Also, since the transmittance can be controlled by the thicknesses of the Ag thin films 14, 16, the thin film 12 may be formed in such a manner that its thickness becomes gradually larger from its thick portion to its thin portion. This arrangement is adopted so as to lower the sensitivity of the sensor with respect to a long wavelength band (e.g., 500 nm 750 nm) of the spectral light relative to its sensitivity to a short wavelength band (e.g., 420 nm–500 nm) thereof, since the quality of light of the halogen lamp is small in the short wave band of 420 nm–500 nm and the sensitivity of the two-dimensional image sensor is low in the short wave band. In order to lower the sensitivity of the sensor, in the example shown in FIG. 10, the thicknesses of the thin films 14, 16 on the long wave band-side thereof are made large, thereby lowering the transmittance. The central wavelength of light separated by this metal interference filter 34 is determined in correspondence with the thickness of the wedge-shaped thin film 12, the greater the thickness, the more the central wavelength is located on the short-wave side.

It is necessary to jointly use a sharp cut filter or band-pass filter 13 so as to cut unnecessary interfering light, such as by using secondary interfering light for the short wavelength band and primary interfering light for the long wavelength band. Furthermore, a protective layer of Ag film (SiO film, $MgF_2$ film) may be superposed on the thin film so as to prevent the deterioration of the film.

Figure 11:
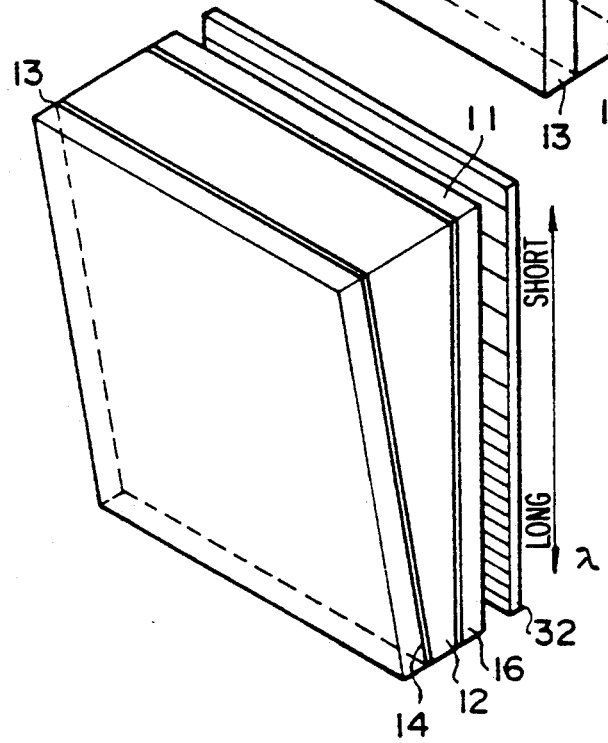

FIG. 11 illustrates a second example of the first sensor, in which the metal interference filter comprises the thin film 12 of magnesium fluoride $MgF_2$ with its width changing in the form of a wedge, as well as the thin films 14, 16 of silver Ag which are deposited with the thin film 12 placed therebetween and have uniform thicknesses. Additionally, in order to cut unnecessary interfering light, the sharp cut filter or band-pass filter 13 is superposed thereon. In this first sensor, in order to lower the sensor sensitivity to the long wave band relative to the its sensitivity to the short wave band, the area of pixels on the short-wave side of the two-dimensional image sensor is made larger than the area of pixels on the long wave side thereof. Since the quantity of light received by one pixel becomes large thanks to the increased area, the sensitivity on the short-wave side becomes higher than the sensitivity on the long-wave side.

Figure 12:
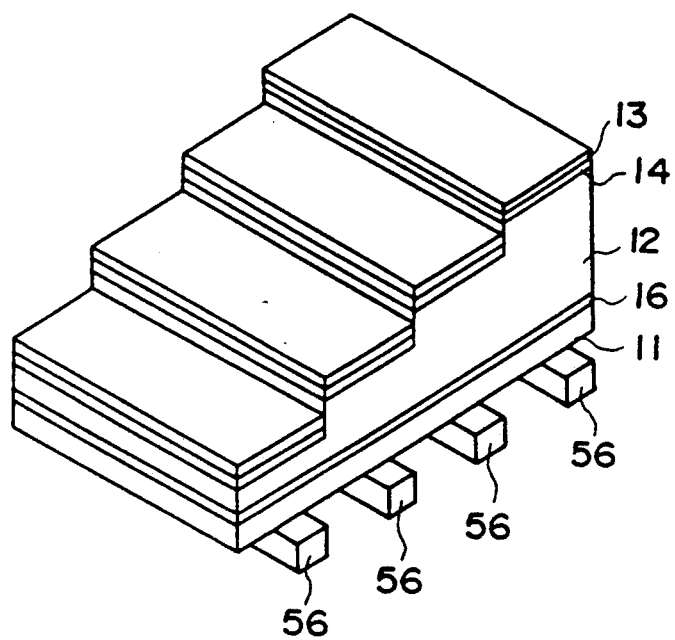
Figure 13:
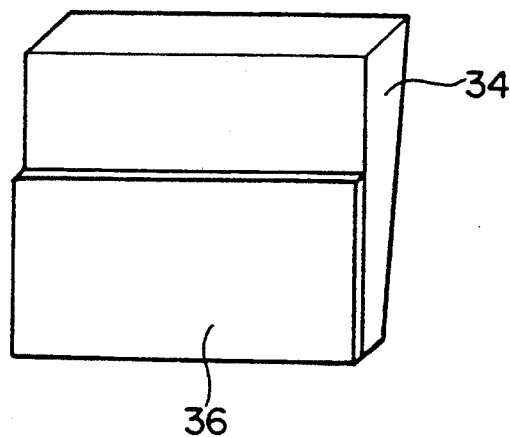

It should be noted that although in the above example the interference film is formed into the wedge-shaped configuration so as to change its thickness, the thickness of the interference film may be changed into the configuration of steps, as shown in FIG. 12. In FIG. 12, the same components as those of the above example are denoted by the same reference numerals, and a description thereof will be omitted. In this stepped interference filter, the photometric conversion elements 56 are disposed in correspondence with its portions having the same thickness, but the two-dimensional image sensor 32 may be disposed in the same way as described above. If the thicknesses of this stepped interference filter are set to be those allowing the central wavelengths of 510, 535, and 555 nm to be obtained, respectively, this filter can be made similar to the filter for G light described above. Also, the filters for B and R light can be fabricated in a similar manner. In addition, as shown in FIG. 13, a transmitted light quantity controlling filter 36 such as a color filter, an ND filter, or the like may be provided on the long wavelength-band side of the metal interference filter 34 so as to lower the sensitivity. Furthermore, instead of magnesium fluoride, cryolite may be used as the film having a low refraction index.

Figure 14:
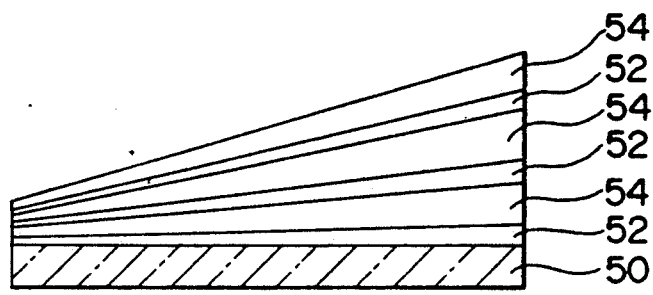

FIG. 14 illustrates still another example of the interference filter. This interference filter is arranged such that alternating films, consisting of a film 52 formed of a high refractive index material, such as titanium oxide $TiO_2$, cerium oxide $CeO_2$, or the like, and a film 54 formed of a low refractive index material, such as magnesium fluoride $MgF_2$, are vacuum deposited on a glass substrate 50. Since the relationship between the central wavelength λ, the refractive index n, and the film thickness d can be expressed by $\lambda = 4 \cdot n \cdot d$, the film thicknesses are determined on the basis of this formula. As the ratio between the thickness of the film 52 and that of the film 54, 1:3 or 3:1 is ordinarily used. In order to make the film thickness to change continuously, it suffices to dispose the substrate such as as to be inclined with respect to a vapor generating source and effect deposition using a vacuum deposition machine, or it suffices to effect deposition by disposing a mask for controlling the film thickness in front of the substrate. Instead of the substrate, deposition may be effected on the image sensor.

If an inert gas such as nitrogen gas is sealed in and sealed with cover glass after formation of the filter or deposition of the filter on the image sensor, it is possible to improve the durability of the deposited film. In order to cut unnecessary transmitted light on the short-wave side or the long-wave side, a colored glass filter for cutting ultraviolet rays or infrared rays or a dielectric multilayered filter is jointly used with this filter.

Figure 15:
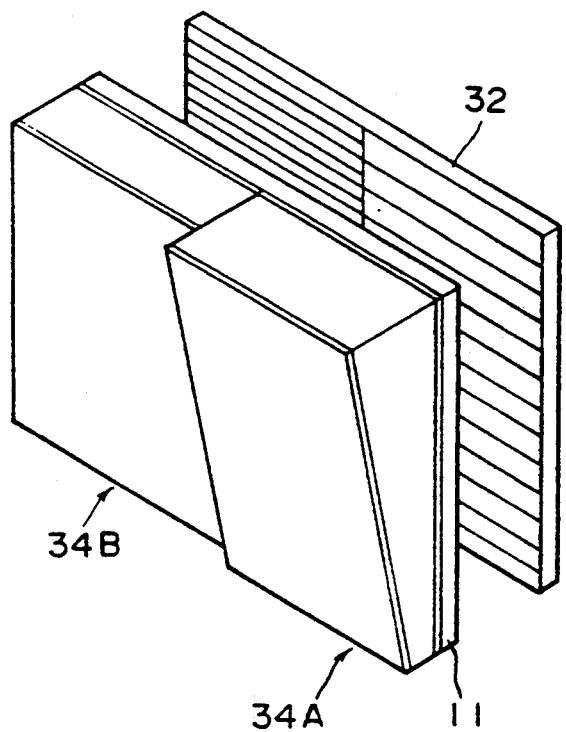

FIG. 15 illustrates still another example the first sensor. This first sensor comprises the two-dimensional image sensor 32, an interference filter 34A for the short wave band provided on the transparent substrate 11, and an interference filter 34B for the long wave band. The maximum thickness of the interference filter 34A for the short wave band is formed to be greater than the maximum thickness of the interference filter 34B for the long wave band. In addition, the area of the pixels on the short wave band side of the two-dimensional image sensor 32 is wider than the area of the pixels on the long-wave side thereof, thereby lowering the sensitivity to the long wave-band side of the spectrum relative to the sensitivity to the short wave-band side thereof.

The first sensor may comprise three wedge-shaped or stepped interference sensors, including the filter for R light (for 680-710 nm), the filter for G light (for 540-560 nm), and the filter for B light (for 450-485 nm) for photometrically measuring a photometric region by dividing it into three wavelength bands corresponding to the maximum sensitivity wavelength bands of the color paper, and may also comprise a two-dimensional image sensor. Naturally, the sensor may have the three interference filters integrated into one unit, or may have three separate interference filters, or may have only two of them integrated into a unit. In cases where the sensor is arranged with three separate filters, the interfering light can be selected readily and the quantity of transmitted light can be easily controlled by using a band-pass filter or a sharp cut filter. The wavelength region of each interfering filter may be narrowed more than the aforementioned range so as to enhance the accuracy in the spectral wavelength and make the filter compact.

A description will now be given of a second embodiment of the present invention.

In the description of this embodiment, the components, members, and portions that are similar to those of the first embodiment will be denoted by the same reference numerals employed in the first embodiment, and a description thereof will be omitted.

The first sensor 28 and a second sensor 130 are disposed in a direction inclined with respect to the optical axis of the image-forming optical system and at a position where the image density of the negative film 20 can be photometrically measured. The first sensor 28 is arranged as shown in FIGS. 10 to 15 in accordance with the first embodiment, while the second sensor 130 is constituted by a two-dimensional image sensor, a line sensor, or the like, and effects photometry along a scanning line SL by planarly dividing the negative image into a multiplicity of pixels Sn, as shown in FIG. 20. In this case, the photometry of each pixel is conducted with respect to the three primary colors of B, G and R.

The first sensor 28 and the second sensor 130 are connected to an exposure control circuit 140 for controlling exposure amount by calculating an exposure amount control value and controlling the light adjusting filter 60. This exposure control circuit 140 is constituted by a microcomputer having a read only memory (ROM) in which the program of an exposure control routine shown in FIG. 16 and other data are stored, a random access memory (RAM), a central processing unit (CPU).

Figure 16:
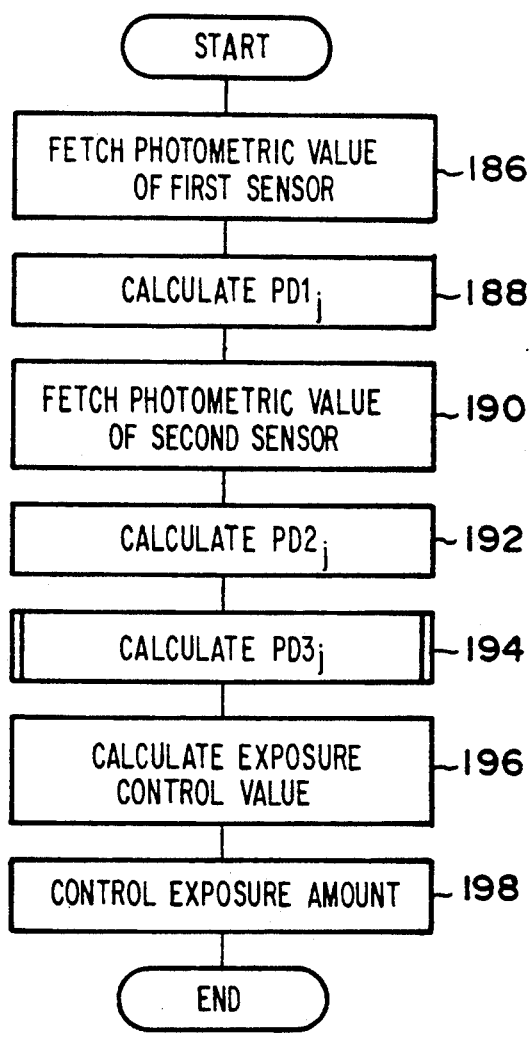
FIG. 16 is a flowchart illustrating a routine for calculating exposure amount in accordance with a second embodiment.
Figure 17:
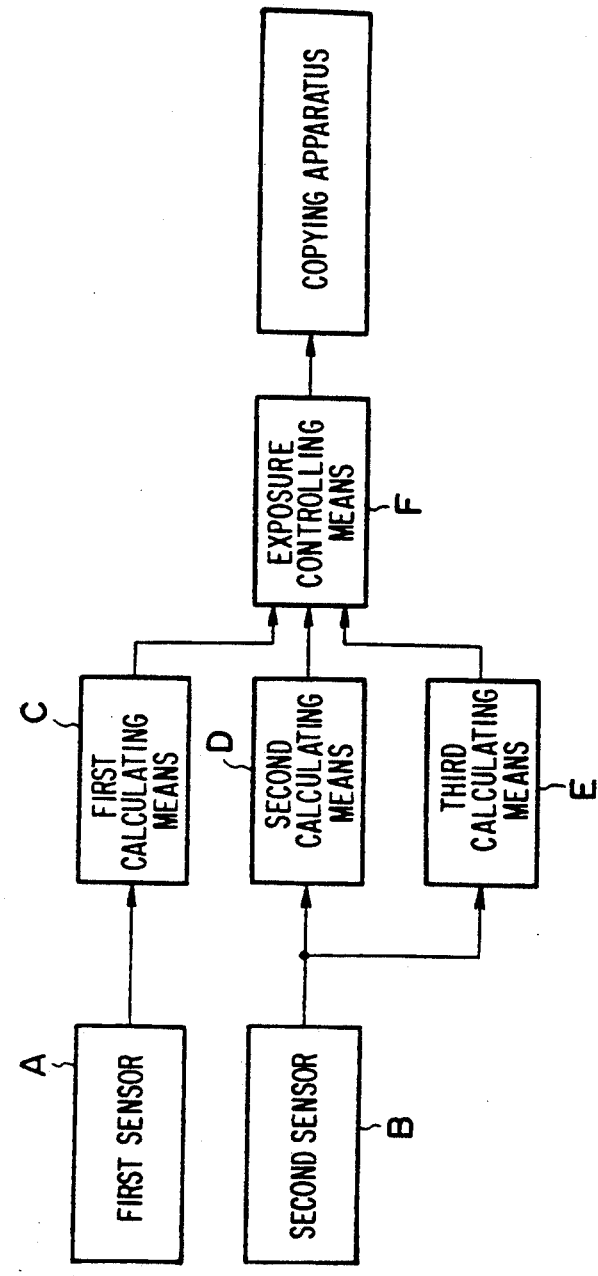
FIG. 17 is a block diagram corresponding to the configuration of the second embodiment.
Figure 18:
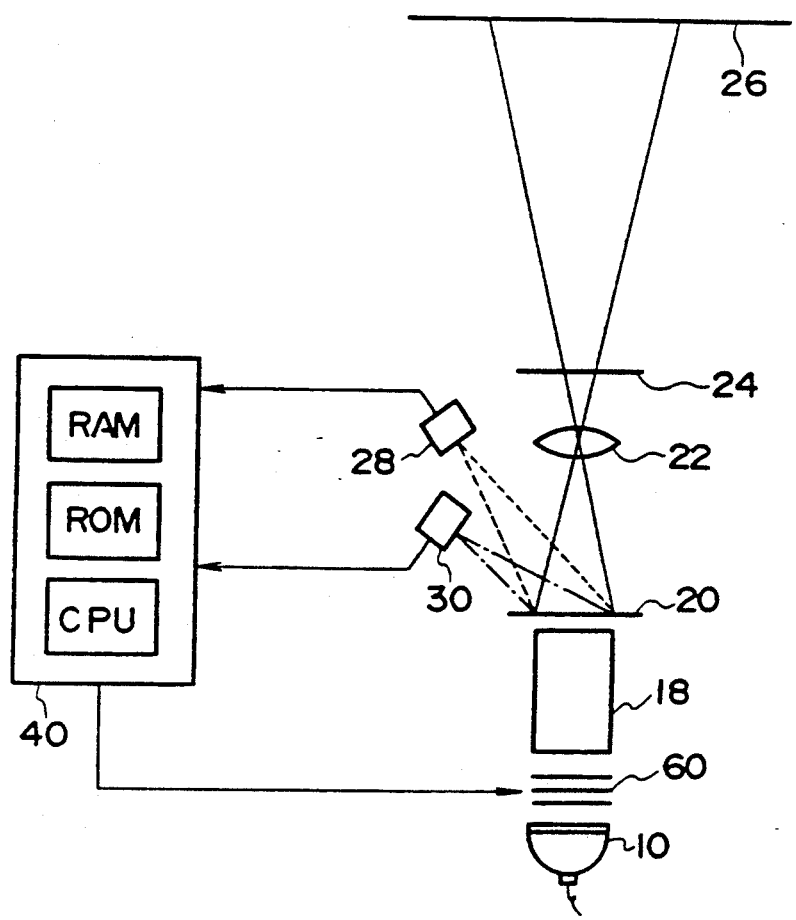
FIG. 18 is a diagram schematically illustrating an automatic color printer in accordance with the second embodiment.

A description will now be given of the exposure amount control routine with reference to FIG. 16. In Step 186, the photometric values $SP_\lambda$ of the first sensor 28 are fetched and, in Step 188, first average image densities $PD1j$ of the respective R, G, and B components are calculated in accordance with the aforementioned Formula (12). In an ensuing Step 190, photometric values ti of the second sensor 130 are fetched. In Step 192, second average image densities $PD2j$ of the respective R, G, and B components are calculated in accordance with the aforementioned Formula (13). In Step 194, third average image densities $PD3j$ are calculated, as will be described later. Then, in Step 196 an exposure control value $Ej$ is calculated by using the aforementioned Formulae (14) and (15). In Step 198, the exposure amount is controlled on the basis of this exposure control value $Ej$. Formula (14) allows a basic exposure amount to be determined on the basis of the first average image densities $PD1j$ and an exposure amount correction value to be determined on the basis of F·f ($PD3j$, $PD2j$). In Step 186, the photometric values $SP_\lambda$ of the first sensor may not be the photometric values themselves, and may naturally be true photometric values or corrected photometric values in which the spectral distributions of the spectral components or separated components are incorporated into the quantity of light.

A detailed description will now be given of the contents of Step 194.

Figure 21:
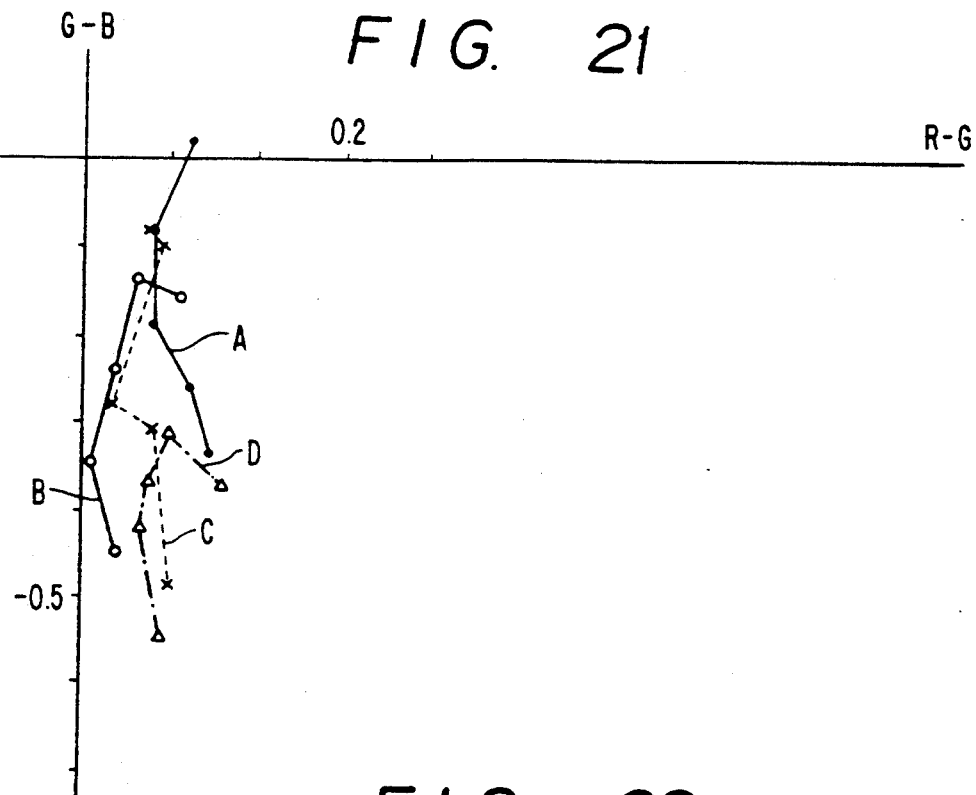
FIG. 21 is a chart in which a multiplicity of average densities are divided into four density levels with respect to the four types of negative film and are shown on color coordinates.
Figure 22:
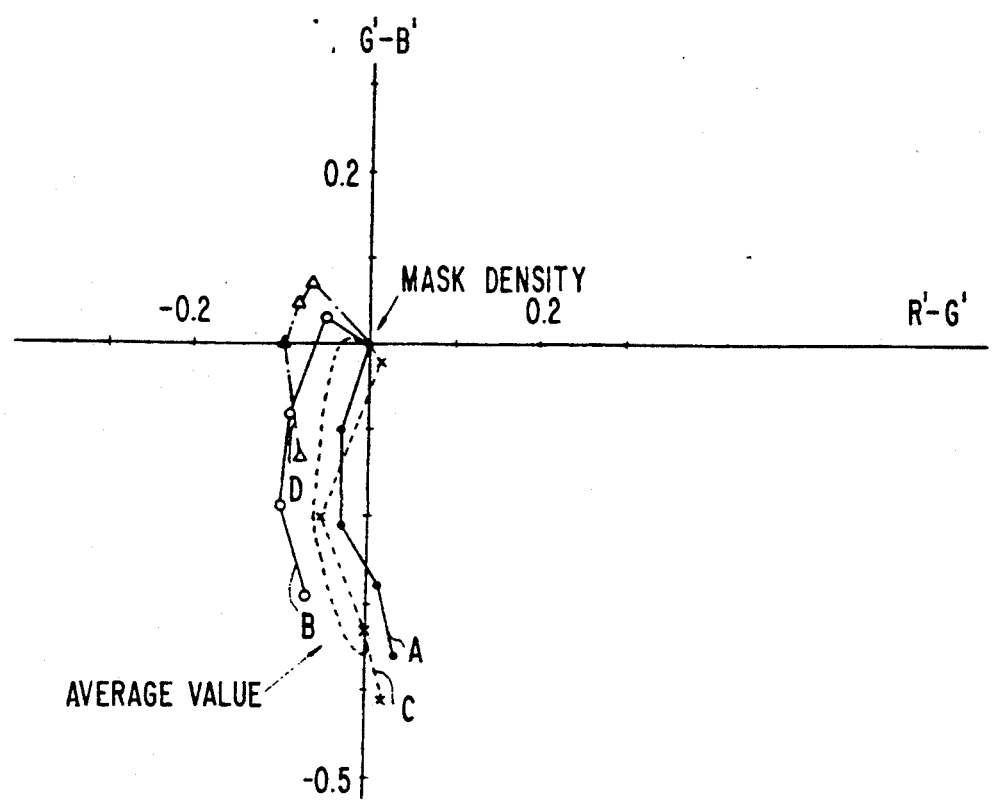
FIG. 22 is a chart showing on color coordinates densities in which the mask densities are subtracted from the average values.

First, a description will be given of the basic principle of calculation. FIG. 19 is an example in which a standard object was photographed by using four types of negative films A, B, C, and D and by consecutively changing the exposure amount, and in which average densities obtained by photometrically measuring the film images are shown on color coordinates with R G set as the abscissa and G B as the ordinate. FIG. 20 shows on color coordinates image densities in which the mask densities of the films are subtracted from the average densities shown in FIG. 19. As can be appreciated from FIG. 20, the densities of image portions of the respective films in which the mask densities are subtracted from the average densities are substantially approximate to each other with the exception of a high density portion of the film C. FIG. 21 shows on color coordinates average densities of a multiplicity of images (about 100 frames) with respect to the aforementioned four types of negative films, the average densities being divided into four density levels. An upper end of each broken line indicates each mask density. Three of the four types of film are substantially different. FIG. 22 shows on color coordinates densities in which the mask densities are subtracted from the respective average densities as well as average values of the densities of the four films. In this chart, the densities of film image portions are substantially approximate to each other in the same manner as FIG. 20.

However, such a coincidence has not been found with negative films produced up until recent years. Combinations of negative films and papers manufactured by only one or a very few number of manufacturers have been prevalent in most cases. It was sufficient if favorable photographic prints could be obtained in those combinations. No sufficient consideration has been given to the other combinations. In recent years, however, as a result of the worldwide diffusion of various types of films, the number of possible combinations of various types of negative films and various types of color papers has reached an enormous scale. In order to ensure that any combination can be used, it is necessary that the characteristics of the gradation balance of various film types be approximate to each other. The results of FIGS. 19 and 21 show that the gradation balance characteristics of the various types of films are approximate to each other.

However, the characteristics of coloring materials used in various films are naturally different, and the light-sensitive material designing techniques are not similar, so that the mask densities are not identical for the respective film types.

Figure 23:
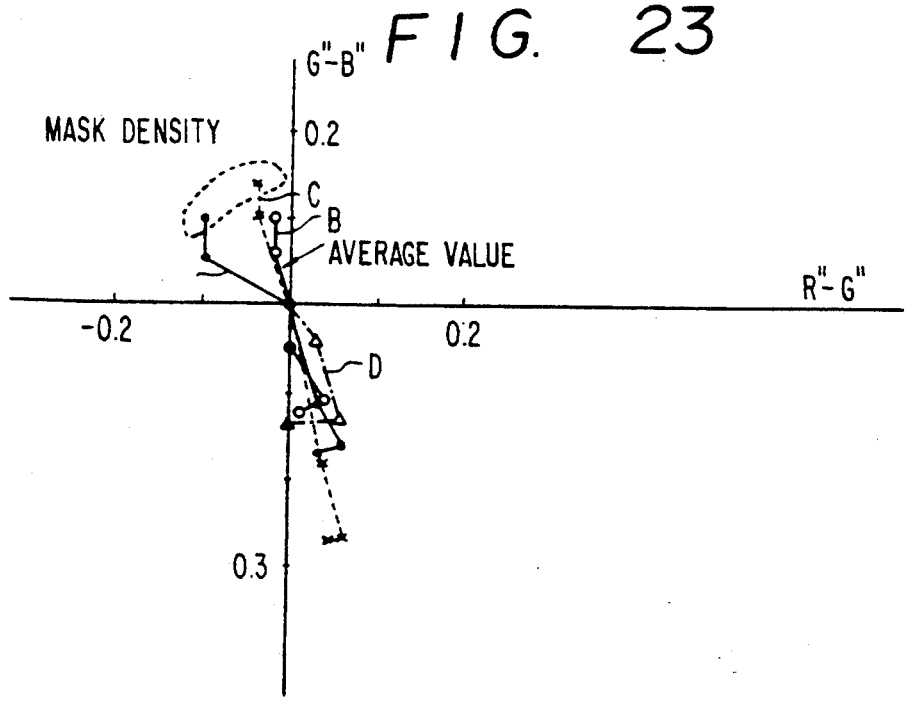
FIGS. 23 and 24 are charts in which values obtained by subtracting photometric data for a low-density portion is subtracted from average values are shown on similar color coordinates to those of FIGS. 20 and 22.
Figure 24:
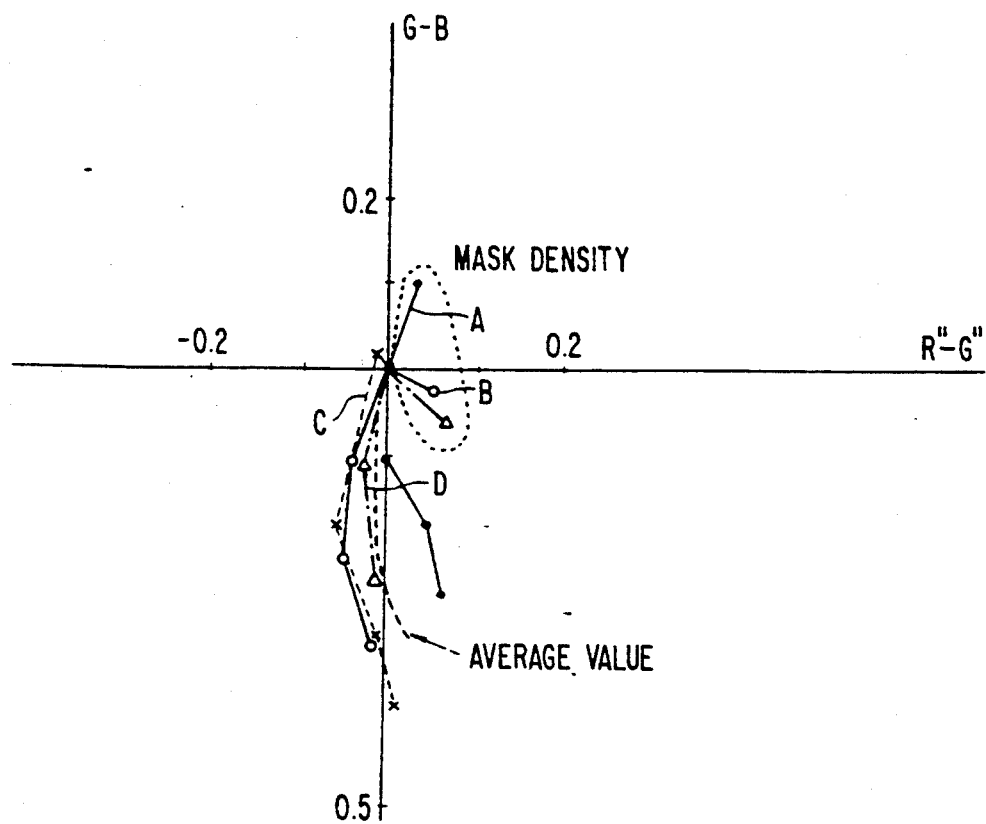
Figure 25:
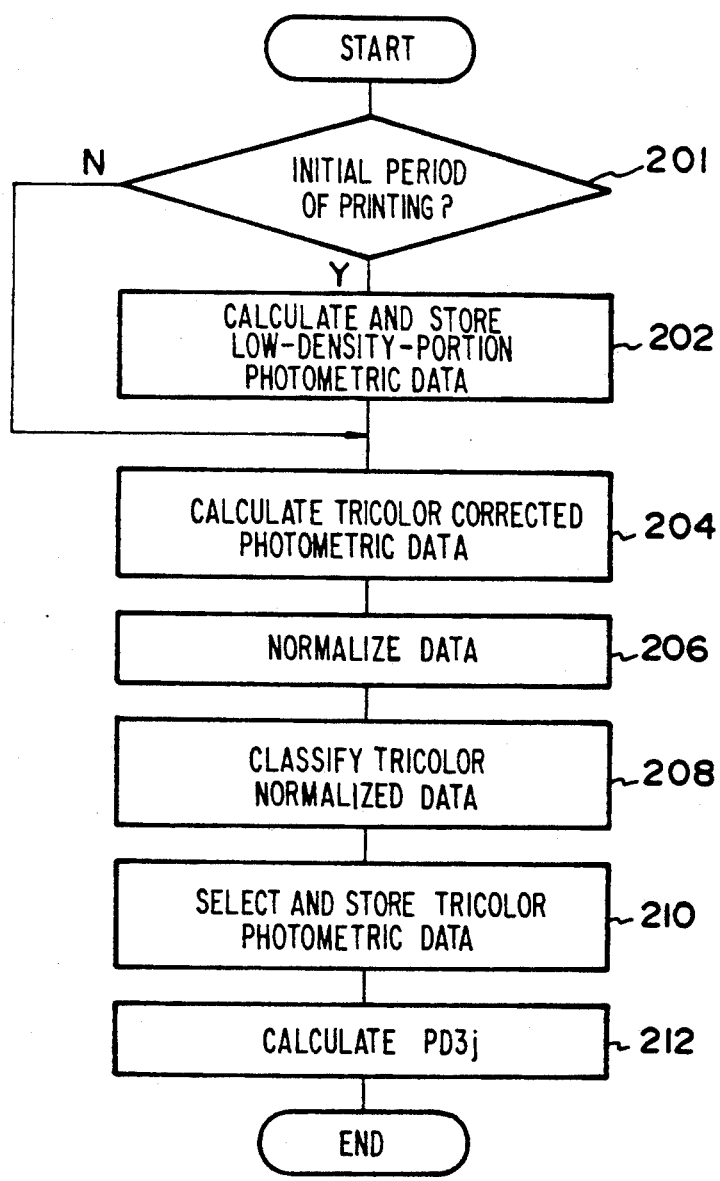
FIG. 25 is a flowchart illustrating the details of a first step 94.
Figure 26:
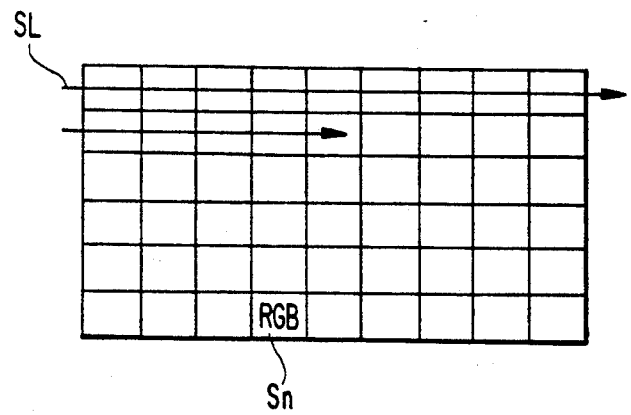
FIG. 26 is a diagram illustrating a state in which photometry is conducted using a second sensor by planarly dividing a film into a plurality of segments.

FIGS. 23 and 24 illustrate cases in which values in which, instead of the mask densities, photometric data on low-density portions of film image portions are subtracted from average densities are shown on the same color coordinates as those of FIGS. 20 and 22. A better coincidence can be obtained for important density regions with respect to the four types of films than subtracting the mask densities.

Accordingly, average density values of one film in which low density-portion photometric data including the mask density are subtracted from photometric values may be used as the image-portion characteristic of each type of film. In addition, an average value of a plurality of average density values mentioned above may be used for each type of film.

As described above, irrespective of the type of film, a similarity can be noted for the tricolor photometric data in which the mask density or a low density close to it, i.e., either lowest-density data, other than an image recorded portion, of a color film, or lowest-density data on the image recorded portion of the color film is subtracted from the average density. For this reason, in this embodiment, tricolor corrected photometric data is obtained by correcting tricolor photometric data with low-density-portion photometric data by such as subtracting photometric data on a low-density portion of the color film, including the image recorded portion, from the tricolor photometric data obtained by dividing the color film with an image recorded thereon into a multiplicity of segments and by photometrically measuring the segments. This tricolor corrected photometric data is transformed into tricolor normalized data by being normalized in accordance with a predetermined condition of transformation. This tricolor normalized data is classified by being compared with a reference value, the tricolor photometric data is selected in correspondence with this classification, and exposure amount is determined on the basis of an average value of the tricolor photometric data selected.

As has been described with respect to the mask density, since the mask densities do not coincide with each other among the types of film, it is preferable to determine the low-density-portion photometric data, including the mask density, with respect to each type of color film.

A description will now be given of a routine for calculating the average density in accordance with the above-described basic principle. In Step 190, tricolor photometric data photometrically obtained by the second sensor 130 is fetched, and a determination is made in Step 201 as to whether or not photometry is to be effected for an initial stage of printing, i.e., whether or not photometry is to be effected for a printing-start image frame or for a number of frames beginning with the printing-start image frame (a maximum of six frames or thereabouts). If the case is photometry for the initial stage of printing, the operation proceeds to Step 202, and if it is not photometry for the initial stage of printing, the operation proceeds to Step 204. In Step 202, by using values stored in advance in the ROM, e.g., an average mask density, tricolor low. density-portion photometric data MIN (R), MIN (G), and MIN (B) are calculated and are stored in the ROM. Parenthetically, the average mask density is determined by averaging the mask densities or average lowest densities of various types of film. A comparison is made between a value which is greater by a predetermined value α (e.g., 0-0.6) than the average mask density on the one hand, and the lowest-density value of the tricolor photometric data or an average value of the tricolor photometric data on the other. When (the average mask density + α) > (a lowest-density value of the tricolor photometric data or an average value of the tricolor photometric data), the lowest-density value of the tricolor photometric data or an average value of the tricolor photometric data is set as the low-density-portion photometric data. Meanwhile, when (the average mask density + α) < (a lowest-density value of the tricolor photometric data or an average value of the tricolor photometric data), the value which is greater by the predetermined value α than the average mask density is set as the low-density-portion photometric data.

Figure 27:
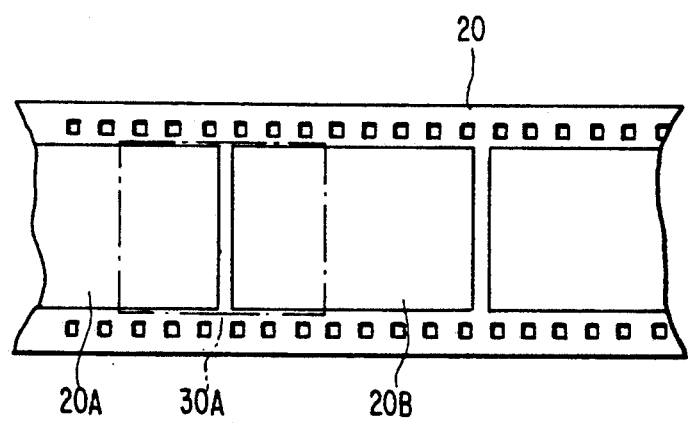
FIG. 27 is a diagram illustrating a state in which a mask density is photometrically measured by the second sensor.

It should be noted that a lowest-density value of the tricolor photometric data obtained with a photometric area 30A of the second sensor 130 straddling image frames 120A, 20B, as shown in FIG. 27, may be set as the low-density-portion photometric data. In addition, the low-density-portion photometric data may be determined for each film type by storing in advance the mask density, i.e., the low. density-portion photometric data, in the ROM for each type of film and by detecting a so-called DX code indicating the film type to determine the film type.

Since the low-density-portion photometric data is determined as described above, there are cases where this low-density-portion photometric data is the lowest-density data on an image-recorded portion of the color film and where it is the lowest-density data on a portion other than the image recorded portion of the color film (i.e., the mask density). This lowest-density-portion photometric data is determined by conducting photometry of a printing start image frame or for a number of frames beginning with the printing-start image frame (a maximum of six frames or thereabouts).

In the ensuing Step 204, tricolor corrected photometric data R, G, B are calculated by subtracting the low-density-portion photometric data MIN (R), MIN (G), MIN (B) from the respective tricolor photometric data. This corrected photometric data show characteristics that closely resemble each other irrespective of the type of film, as described above.

Figure 28:
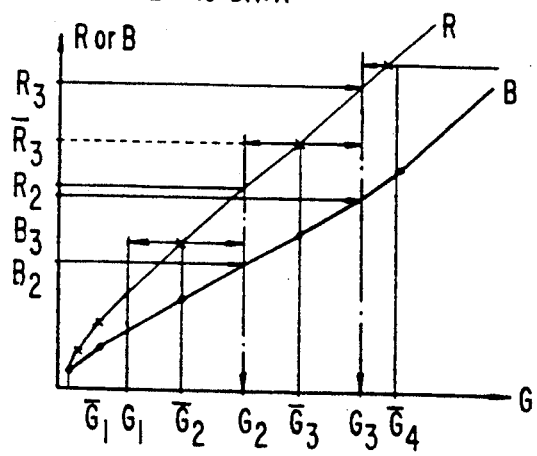
FIG. 28 is a chart illustrating normalization curves.

In an ensuing Step 206, the tricolor normalized photometric data is calculated by normalizing the corrected photometric data R, B by transforming the same into the density of G by using normalization curves shown in FIG. 28. The film density and the gradation balance vary depending on the exposure level and the type of film, so that when an identical object is photographed, the image density and color vary due to the exposure level and the type of film. The normalization processing is provided to obtain a fixed density and color on the negative film by correcting the same with respect to the identical object irrespective of the exposure level and the type of film. In addition, the normalization table is prepared on the basis of a curve indicating the relationship between an average value of the photometric data G and an average value of the photometric data R, as well as a curve (FIG. 28) indicating the relationship between an average value of the photometric data G and an average value of the photometric data B, these data being stored in the RAM.

The aforementioned corrected photometric data R, B are transformed into the density of G by using the above described normalization table. As shown in FIG. 28, for instance, an average value $\overline{R}_3$ of the corrected photometric data $R_2$ and $R_3$ is transformed into an average value $\overline{G}_3$ of $G_2$ and $G_3$, and an average value $\overline{B}_3$ (not described) of corrected photometric data of $B_2$–$B_3$ is similarly transformed into an average value $\overline{G}_3$. At this time, the corrected photometric data G is used as it is without being transformed. As a method of this normalization, it is possible to use the methods disclosed in Japanese Patent Laid-Open Nos. 1039/1981 and 144158/1987 in addition to the above described method.

Through such normalization of corrected photometric data, it is possible to use the same color coordinates even if the film density and the film type differ, and it is possible to set the origin of the coordinate at an arbitrary color. If it is assumed that an average value of the photometric data on a multiplicity of films becomes gray, the three colors of the normalized data on a gray object come to assume an identical density by means of the above described normalization. In practice, since the average value of the photometric data on a multiplicity of films is slightly different from gray, a correction is made by an amount corresponding to that difference.

Figure 29:
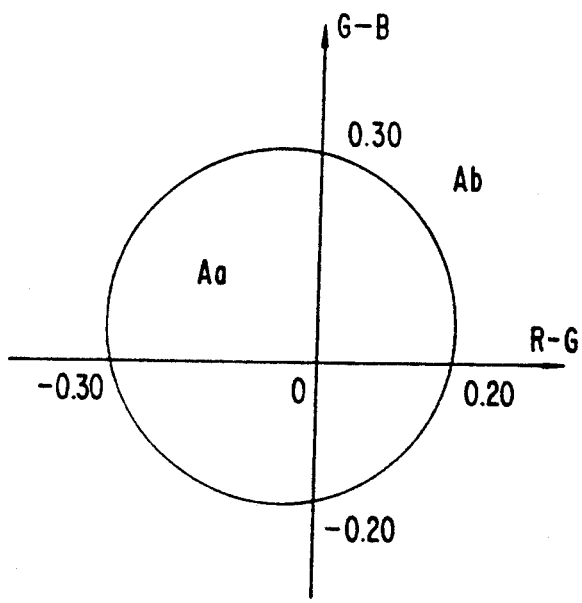
FIG. 29 is a chart illustrating color coordinates for classifying tricolor normalized data.

In an ensuing Step 208, as shown in FIG. 29, the tricolor normalized data is classified by determining to which color region the tricolor normalized data belongs, between a color region $A_a$ including the origin and a color region $A_b$ excluding the color region $A_a$, both regions being set on color coordinates with a difference, R-G, between the normalized data R and G taken as the abscissa and a difference, G-B, between the normalized data G and B taken as the ordinate. The tricolor normalized data is classified with a boundary between the color region $A_a$ and the color region $A_b$ serving as a point of demarcation, so that the tricolor normalized data is classified into data belonging to a region where the color difference from a reference value (origin) is small and into data belonging to a region where the color difference from the reference value is large.

The following table shows examples of a combination of the color regions, the tricolor normalized data classified for each of these color regions, and the tricolor photometric data corresponding to the tricolor normalized data.

TABLE

| Region | Photometric No. | Tricolor Photometric Data | | | Tricolor Normalized Data | | |
|---|---|---|---|---|---|---|---|
| | | R | G | B | R | G | B |
| Aa | 1 | 0.72 | 1.03 | 1.17 | 0.60 | 0.63 | 0.57 |
| Aa | 2 | 0.69 | 1.05 | 1.19 | 0.57 | 0.65 | 0.59 |
| Ab | 3 | 0.62 | 1.15 | 1.21 | 0.50 | 0.75 | 0.61 |
| Ab | 4 | 0.60 | 1.18 | 1.20 | 0.48 | 0.78 | 0.60 |
| — | — | — | — | — | — | — | — |
| — | — | — | — | — | — | — | — |
| — | — | — | — | — | — | — | — |

It should be noted that although in the above the tricolor normalized data is classified by using color coordinates using G B and R G as axes, it is possible to use as two- or three-dimensional color coordinates a coordinate axis having as its axis one color or a combination of two or more colors of the three primaries (e.g., Dx Dy, Dx/Dy, Dx/(Dx+Dy+Dz), aDx+bDy+cDz, Dx/K, etc., where x, y, and z respectively represent a mutually different one color selected from among R, G, and B, and a, b, c, and K are constants), i.e., a coordinate axis having as its axis a color difference other than the above or a color ratio. In addition, a plurality of color regions may be determined in correspondence with a distance from a reference value. As this reference value, it is possible to adopt such as an origin of the color coordinates used, a value concerning a specific color of the original image, a value obtained from an average value of a multiplicity of images, a minimum value of photometric data, a value obtained from photometric data on a specific image, a predetermined specific constant, and so forth. Furthermore, the reference value may be a value given by a functional expression or a table. In this case, the functional expression or table may be such that a reference value changes depending on, for instance, an image density. It should be notes that as a specific color of the original image, a neutral color, a color of skin, or a color determined from an average value of a multiplicity of images.

Figure 30:
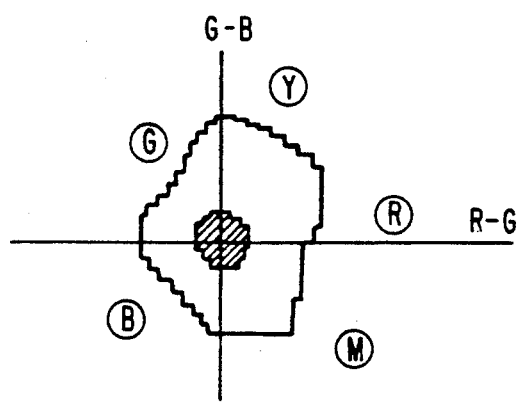
FIG. 30 is a chart illustrating other color coordinates for classifying tricolor normalized data.

In addition, as a color region, it is possible to use a color region in which a distance to its periphery from an origin provided on coordinates having a neutral color as an origin is irregular, as shown in FIG. 30.

In Step 210, the tricolor photometric data corresponding to the tricolor normalized data belonging to the color region $A_a$ in which a color difference from the reference value is small is selected and stored in the RAM. In Step 212, the selected tricolor photometric data is arithmetically averaged, and the third average image density PD3j is calculated. It should be noted that in cases where the tricolor normalized data is classified on the basis of coordinates having color ratios as axes, the tricolor photometric data corresponding to the tricolor normalized data belonging to a color region whose color ratio from a reference value is small is selected, and this tricolor photometric data is averaged so as to calculate the third average image densities PD3j. In these cases, a setting is provided as F=1.0.

As can be appreciated from FIGS. 20, 22, 23, 24, the color balance between R and G is substantially fixed in terms of the density, and the density of B becomes relatively higher than the density of G as the densities of G and B increase. Accordingly, in this case, it is necessary to ascertain to what extent a difference exists between the photometric data and the low-density-portion photometric data such as the mask density. An error of ±0.3 can be allowed for the density (e.g., density of G) if the color balance is allow to vary by ±0.05 (since the image density of a gray object varies due to different photographing light sources, cameras, chronological changes of the film, characteristics between lots, etc., the normalization curve also has a margin of variation, so that this allowable error is set at ±0.05). Namely, if the error of the image density of the photometric data is within ±0.3, the color balance can be estimated with an error of within ±0.05. As a result, it suffices if the low-density-portion photometric data is within ±0.3 with respect to the mask density or the mask density plus $\alpha$.

It should be noted that this embodiment is also applicable to the method in which image densities determined from photometric values are stored in the storage means for each type of film, the photometric values are then normalized by using the multiplicity of image densities stored, and correction amount is determined by using the normalized data. In this case, since the resultant correction amount is determined from the tricolor normalized data, it is necessary to revert the correction amount to the level of a photometric value by performing an inverse calculation to that of normalization. This inverse calculation can be attained by setting F as a coefficient or a functional expression.

In addition, color control may be effected by using the first average image densities PD1j, and density control may be effected by using the second average image densities. In this case, the following average value of density is used as the second average image density:

$$PD2 = -\frac{1}{n}(\Sigma \log t_i)/KD$$

where KD is a constant which is determined by calibration.

As described above, in this embodiment, the first average image densities determined from photometric values of the first sensor are compared with the second average image densities determined from photometric values of the second sensor, the basic exposure amount is determined on the basis of the first average image densities without correcting the exposure amount with respect to spectral differences of the sensors, and correction is effected by using the second and third average image densities. By directly employing the first average image densities, higher color correction performance can be obtained without deteriorating the correction performance for the film types, since correction with respect to an object through the second and third average image densities is of such quality that the spectral photometric accuracy may not be high.

It should be noted that although in the above a description has been given of an example in which the first and second sensors are disposed in the exposure system, an arrangement may be alternatively provided such that the photometric system is disposed upstream of the exposure system, and the first and second sensors are disposed in this photometric system. In addition, either the first or second sensor may be disposed in the exposure system, the remaining sensor being disposed in the photometric system. Additionally, an arrangement may be adopted such that the photometric values of the sensors are transmitted to the exposure control circuit on an on-line basis. This example includes a combination of a color film analyzer having the second sensor and a printer having the first sensor.

A description will now be given of a third embodiment of the present invention.

In the description of this embodiment, those members, components, and portions that are similar to those of the first embodiment are denoted by the same reference numerals as those used in the first embodiment, and a description thereof will be omitted.

Figure 31:
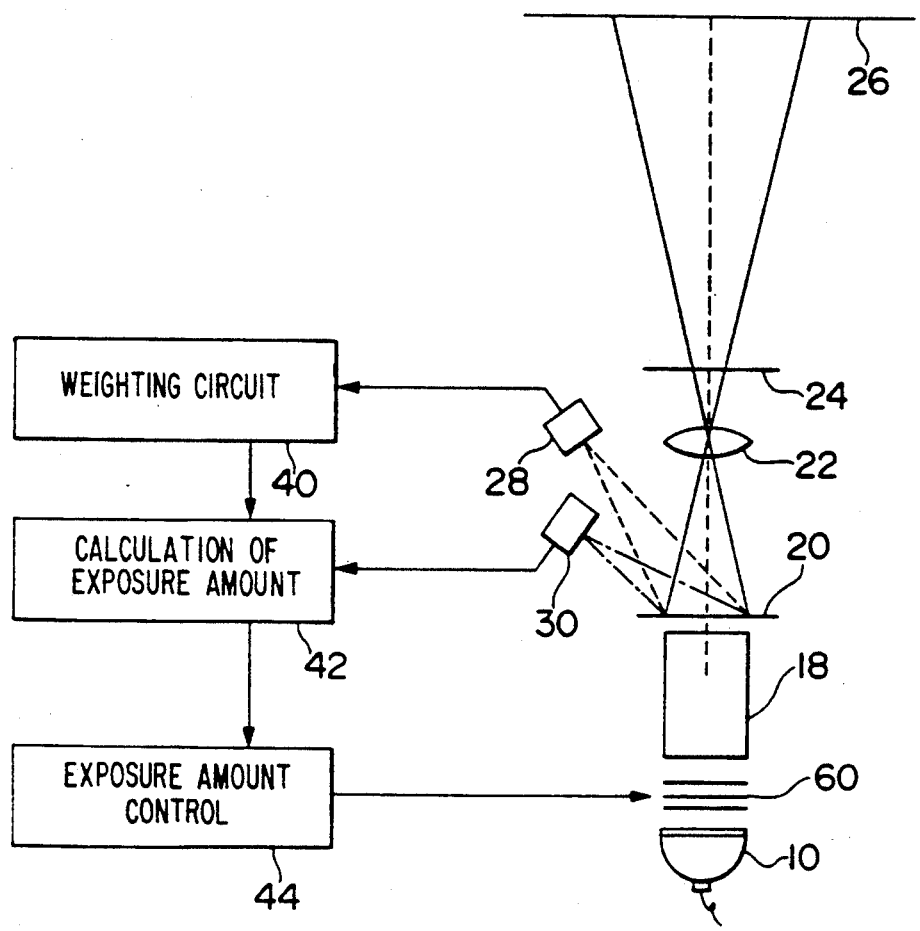
FIG. 31 is a diagram schematically illustrating another embodiment of a color automatic printer to which the present invention is applicable.

In this embodiment, the present invention is applied to a color photographic printer. As shown in FIG. 31, the first sensor 28 is directly connected to an exposure amount calculating circuit 343 via a weighting circuit 340, while the second sensor 30 is connected to the exposure amount calculating circuit 343. An exposure amount controlling circuit 344 is adapted to calculate exposure control amount on the basis of an output of the exposure amount calculating circuit 342 and control the light-adjusting filter 60.

The weighting circuit 340 determines a synthetic value Si on the basis of spectral photometric values by using a weight coefficient Kij as shown in Formula (16) below:

$$SSi = -\log_{10}\left\{\sum_{j=1}^{n} Kij \cdot (Sij/Soij)\right\} \quad (16)$$

In Formula (16), Sij/Soij is a transmittance at each wavelength ij of the film image, and the synthetic value Si is a density in a case where the density is assumed to be 0 when film is absent. Naturally, a value in which $\alpha i$, $\beta i$ are added thereto, $S'i = \alpha i + \beta i SSi$, may be used in the calculation of exposure amount. Soij is a spectral photometric value at a pixel ij when the film image is absent, and Sij is a spectral photometric value of light transmitted through the original picture at the same pixel. i represents each wavelength band of R, G, and B, and j represents the respective number of photometric wavelengths (=the number of pixels) among R, G, and B.

If it is assumed that L is a constant (which is determined on the basis of the wavelength interval or wavelength distribution of spectral light, correction due to insertion of a reference filter or a film, or other similar factor; the value may be altered for each wavelength), that j is set with respect to wavelengths at 10 nm intervals, that PSij is a virtual spectral sensitivity to the wavelength of a copying material including the exposure optical system, and that Soij is a spectral photometric value at each pixel j in the case where the film is absent, then the aforementioned weight coefficient Kij is determined from Formula (17). This coefficient Kij may be stored in advance in the apparatus, or determined for each apparatus.

$$PSij = Kij(L/Soij) \quad (17)$$

Figure 32A:
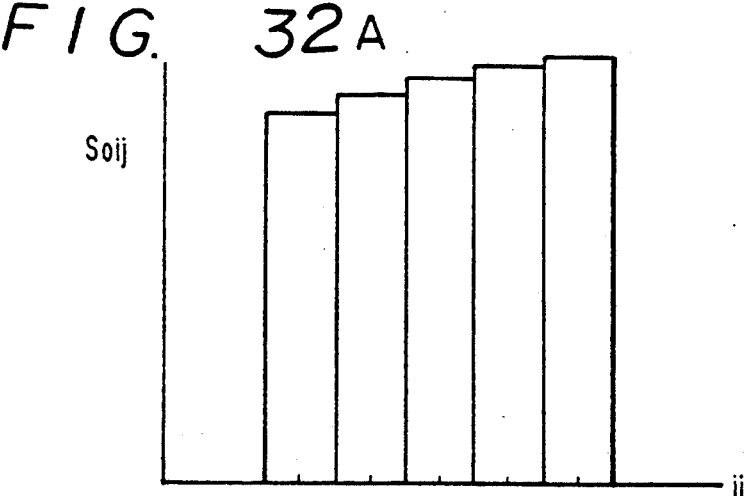
FIGS. 32A and 32B are charts illustrating Formula (17)
Figure 32B:
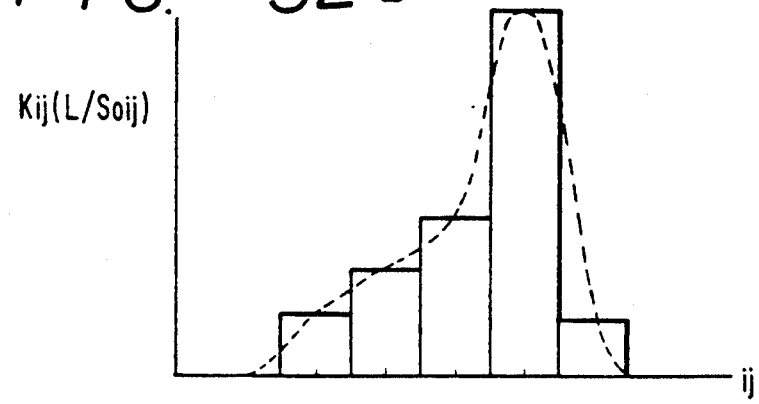

FIGS. 32A and 32B illustrate Formula (17). The dotted line in FIG. 32B shows a relative spectral sensitivity distribution of the copying material.

It should be noted that the present invention is not to be restricted to Formulae (16) and (17). In particular, it is preferable to take into account the wavelength width of the spectrum, the spectral wavelength interval, and a distribution configuration due to the fact that spectra are not ideal. Basically, it suffices if Kij is determined in such a manner that the area indicated by the dotted line (a relative spectral sensitivity distribution of the copying material) and the area indicated by the solid line (a sensitivity distribution of each pixel of the sensor) agree each other.

Figure 34:
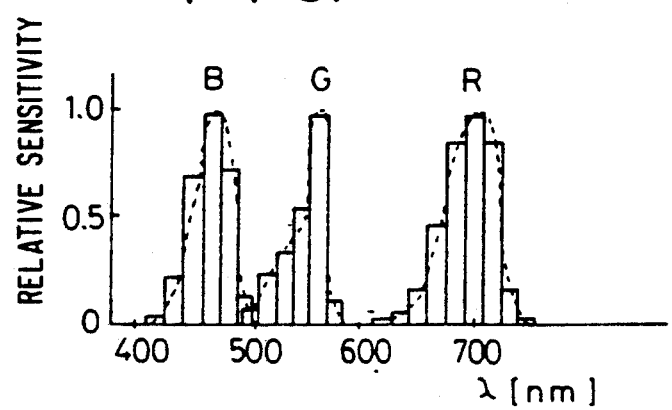
FIG. 34 is a chart illustrating relative sensitivity distributions of R, B and G.

FIG. 34 illustrates the relative spectral sensitivity distributions of R, G, and B resulting from the weighting of the first sensor in cases where ideal spectra have been obtained. That is, the drawing shows the weight of each spectrum at a time when the maximum sensitivity wavelengths of B, G, and R at the first sensor are set to 1.0. When the maximum sensitivity is set to 1.0, FIG. 34 is equivalent to the relative sensitivity distribution of B, G, and R. The dotted line shows the spectral sensitivity distributions of the copying sensitive material.

Figure 33A:
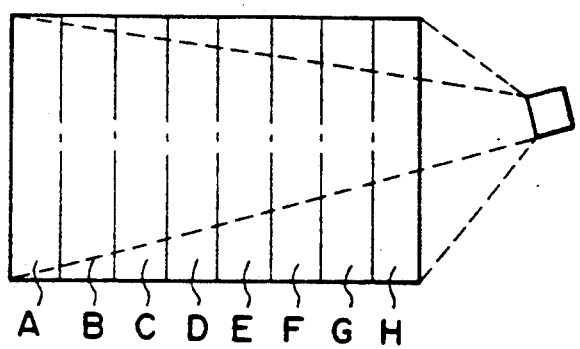
FIGS. 33A and 33B are plan views illustrating how calibration is conducted at the time of diagonal photometry.
Figure 33B:
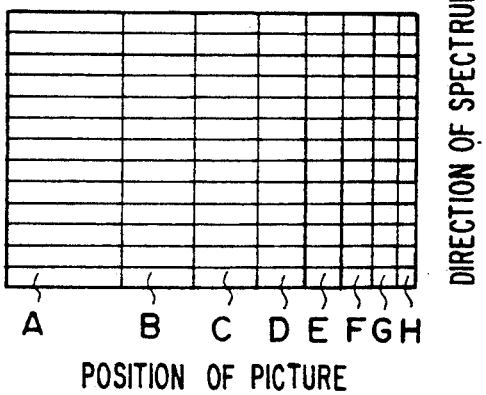

Since the first and second sensors effect photometry diagonally with respect to the optical axis, calibration is effected in such a manner that equal photometric values will be obtained over the entire photometric picture when the film is absent, or when the reference film or filter is inserted, FIG. 33A illustrates the manner in which the first sensor is arranged such that the thickness of the interference filters will change in the vertical direction, and the film picture is photometrically measured diagonally by the first sensor. FIG. 33B shows the manner in which positions A-H on the film shown in FIG. 33A are projected onto the sensor. The light is separated in the vertical direction, and the film position is projected in the horizontal direction. The sensitivity and correction values are adjusted in advance through calibration so that equal photometric values (e.g., set to 0) will be obtained at positions A-H projected. By adding the photometric values at A-H with respect to each spectral component, the dependency on the image position in the film due to inclined photometry can be eliminated.

In addition, photometry may be effected by reducing in the direction of A-H by means of a cylindrical lens, and the pixels of the sensor may be made rectangular, as shown in FIGS. 10 and 11 in accordance with the first embodiment.

If output values of the weighting circuit 340, i.e., the synthetic values Si, are Sr, Sg, and Sb, and that the picture average photometric values of the second sensor are mr, mg, and mb, the exposure amount calculating circuit 342 calculated a basic exposure amount Di in accordance with the following formula:

$$Di = (mr + mg + mb)/3 + Si - (Sr + Sg + Sb)/3 \quad (18)$$

where r, g, and b represent red, green, and blue color, and i is any one of r, g, and b.

In Formula (18), the color difference of the first sensor is added to the tricolor average density of the second sensor so as to provide a matching in the average density of the picture between the first sensor and the second sensor. The correction value for the basic exposure amount by means of the second sensor can be obtained if a density correction value is determined with respect to the tricolor average density of the second sensor and color correction values are determined with respect to mr, mg, and mb of the second sensor, and if they are added to the basic exposure amount Di.

It should be noted that the basic exposure amount Di may be calculated in accordance with the following Formulae (19), (20), and (21):

$$Di = (mr + mg + mb)/3 + (Si - Sg) \quad (19)$$

$$Di = mg + (Si - Sg) \quad (20)$$

$$Di = Si \quad (21)$$

In addition, the exposure amount controlling circuit 344 controls exposure amount by controlling the light-adjusting filter in accordance with the basic exposure amount Di.

In order to correct the density, color failures and the like based on the photographed scene, correction amount is calculated on the basis of the photometric values of the second sensor, and exposure amount is controlled by setting as an exposure control value a value in which this correction value is added to the basic exposure amount. A method of calculating correction amount and a method of controlling exposure amount are disclosed in detail in Japanese Patent Laid-Open Nos. 311241/1988 and 311242/1988.

Although in the above a description has been given of the example in which the sensitivity of the sensor is changed differently for the short wave range and the long wave range, an arrangement may be alternatively provided such that, in relation to the average sensitivity to the 400-500 nm wavelength band, the average sensitivity to the 500-600 nm wavelength band is reduced to 50% or less, and the average sensitivity to the 600-750 nm wavelength band is reduced to 20% or less. In this case, the magnitude of respective spectral photometric values in a case where the film is absent becomes approximately the same. Specifically, a filter with a transmittance of 50-20% is superposed on an interference filter with respect to the wavelength band of 500-600 nm, and a filter with a transmittance of 25-5% is superposed on it with respect to the wavelength band of 600-750 nm. In addition, as another method, in relation to the pixel area for the 400-500 nm band, the pixel area for the 500-600 nm band may be reduced to ½ to 1/5, and the pixel area for the 600-750 nm band to ¼ to 1/20.

What is claimed is:

1. An exposure controlling apparatus comprising:
   a sensor for effecting photometry by separating light from an original picture into a plurality of separated components;
   storage means for storing a value characteristic of the spectral sensitivity of said sensor and a value characteristic of the spectral sensitivity of a sensitive material to which an image is copied thereon;
   estimating means for estimating a spectral characteristic of the original picture on the basis of a photometric value of said sensor and the value characteristic of the spectral sensitivity of said sensor stored in said storage means; and
   controlling means for determining a synthetic value which is equivalent to a value measured by a sensor having a spectral sensitivity distribution identical with or similar to a spectral sensitivity distribution of the sensitive material on the basis of the spectral characteristics of the original picture estimated and the value characteristic of the spectral sensitivity of the sensitive material, and for controlling exposure amount on the basis of the synthetic value.

2. An exposure controlling apparatus according to claim 1, wherein adjacent ones of said plurality of separated components have wavelength bands which overlap each other.

3. An exposure controlling apparatus according to claim 1, wherein said sensor has a wedge-shaped or stepped interference filter which is provided with an interference film disposed on a transparent substrate and having varying thicknesses at different positions thereof, said interference filter being adapted to separate the light from the original picture into a multiplicity of separated components.

4. An exposure controlling apparatus according to claim 1, wherein said sensor is arranged to effect photometry by separating a wavelength band corresponding to a maximum sensitivity wavelength band of the sensitive material into a plurality of separated components.

5. An exposure controlling apparatus comprising:
   a sensor for effecting photometry by separating light from an original picture into a plurality of separated components;
   storage means for storing peculiar values obtained by integrating spectral sensitivity distributions of said sensor corresponding to the respective separated components over very fine wavelength sections including a central wavelength of each of the separated components, and spectral sensitivities of a sensitive material corresponding to the very small wavelength sections;
   estimating means for estimating spectral characteristics of the original picture corresponding to the respective very small wavelength sections on the basis of photometric values of said sensor corresponding to the respective separated components and the peculiar values stored in said storage means; and
   controlling means for determining a synthetic value which is equivalent to a value measured by a sensor having a spectral sensitivity distribution identical with or similar to a spectral sensitivity distribution of the sensitive material by integrating the product of the respective spectral characteristics of original picture estimated and the respective spectral sensitivities of the sensitive material, and for controlling exposure amount on the basis of the synthetic value.

6. An exposure controlling apparatus comprising:
a first sensor for effecting photometry by separating light from an original picture into a multiplicity of spectral components, said first sensor including an interference filter which is provided with an interference film disposed on a transparent substrate and having varying thicknesses at different positions thereof, the interference filter being adapted to separate the light from the original picture into the multiplicity of components having central wavelengths corresponding to the thicknesses of said interference film;
a second sensor for photometrically measuring red, green, and blue light by dividing the original picture into a multiplicity of fragments; and
controlling means for determining a basic exposure amount on the basis of a synthetic value determined at least from spectral photometric values of said first sensor, and for controlling an exposure amount on the basis of the basic exposure amount.

7. An exposure controlling apparatus according to claim 6, wherein said controlling means determines the basic exposure amount on the basis of the synthetic value determined from the spectral photometric values of said first sensor, or determines the basic exposure amount on the basis of a color control value determined on the basis of the synthetic value determined from the spectral photometric values of said first sensor and of a density control value determined on the basis of photometric values of said second sensor, and controls the exposure amount on the basis of the basic exposure amount.

8. An exposure controlling apparatus according to claim 7, wherein said controlling means further determines a correction value corresponding to the contents of an image of the original picture on the basis of the photometric values of said second sensor, and controls the exposure amount by means of a value in which the basic exposure amount is corrected by the correction value.

9. An exposure controlling apparatus according to claim 6, wherein said first sensor is provided with a transmitted light quantity controlling layer, or a pixel area of said first sensor is changed, whereby the sensitivity of said first sensor with respect to a long wave band is lowered relative to its sensitivity to a short wave band.

10. An exposure controlling apparatus according to claim 9, wherein said first sensor lowers its sensitivity with respect to a 500-600 nm wavelength band to ½ to 1/5, and its sensitivity with respect to a 600-750 nm wavelength band to ¼ to 1/20.

11. An exposure controlling apparatus comprising:
a first sensor for effecting photometry by separating light from an original picture into a multiplicity of spectral components or a multiplicity of separated components and adapted to output a multiplicity of first photometric values corresponding to the multiplicity of spectral components and the multiplicity of separated components;
a second sensor having maximum sensitivities in wavelength bands corresponding to three sensitivity bands of a sensitive material, and effecting photometry by dividing the original picture into a multiplicity of fragments, said second sensor being adapted to output a multiplicity of second photometric values corresponding the multiplicity of fragments;
first calculating means for calculating a first average image density synthesized by adding weight to each of the multiplicity of first photometric values;
second calculating means for calculating a second average image density by averaging the multiplicity of second photometric values;
third calculating means for calculating a third average image density by averaging the second photometric values belonging to a region whose color ratio or color difference from a reference value on predetermined color coordinates is small; and
controlling means for calculating an exposure amount control value on the basis of the first average image density, the second average image density, and the third average image density, and for controlling the exposure amount on the basis of the exposure amount control value.

12. An exposure controlling apparatus according to claim 11, wherein said first calculating means calculates the basic exposure value on the basis of the first average image density obtained by integrating or totalizing $k_\lambda \cdot SP_\lambda \cdot d_\lambda$ over a predetermined wavelength band where $SP_\lambda$ is a first photometric value at a wavelength $\lambda$ of one of the spectral components or one of the separated components, $k_\lambda$ is weight at the wavelength $\lambda$ to be added to the first photometric value, and $d_\lambda$ is a wavelength width of one of the spectral components or one of the separated components.

13. An exposure controlling apparatus according to claim 11, wherein the second average image density is a density determined from an arithmetic average value of the multiplicity of second photometric values.

14. An exposure controlling apparatus according to claim 11, wherein if it is assumed that the first average image density is PD1j, the second average image density is PD2j, and the third average image density is PD3j, said exposure controlling means calculates the exposure amount control value in accordance with PD1j+F·f(PD3j, PD2j) where j is 1 to 3, respectively representing the three sensitivity wavelength bands of the copying sensitive material, F is a constant or a value expressed by a constant, and f(PD3j, PD2j) is a functional expression comprising the third average image density PD3j and the second average image density PD2j.

15. An exposure controlling apparatus according to claim 14, wherein $$f(PD3j, PD2j) = PD3j - PD2j - \left(\sum_{j=1}^{3} PD3j - \sum_{j=1}^{3} PD2j\right)/3.$$

16. An exposure controlling apparatus comprising:
a first sensor for photometrically measuring an original picture by separating a wavelength band, corresponding to a maximum sensitivity wavelength band of a sensitive material for copying an image of the original picture thereon, into a multiplicity of separated components;

a second sensor for photometrically measuring red, green, and blue light by dividing the original picture into a multiplicity of fragments;

calculating means for calculating a synthetic value which is equivalent to a value measured by a sensor having a spectral sensitivity distribution identical with or similar to a spectral sensitivity distribution of the copying sensitive material for copying by adding weight to photometric values of said first sensor; and controlling means for calculating a basic exposure amount on the basis of the synthetic value determined by said calculating means, or determining the basic exposure amount on the basis of a color control value determined from the synthetic value determined by said calculating means and also on the basis of a density control value determined from photometric values of said second sensor, and for controlling an exposure amount on the basis of the basic exposure amount.

17. An exposure controlling apparatus according to claim 16, wherein the wavelength band corresponding to the maximum sensitivity wavelength band includes a 450-485 nm wavelength band, a 540-560 nm wavelength band, and a 680-710 nm wavelength band.

18. An exposure controlling apparatus according to claim 16, wherein said first sensor comprises a filter on which an interference film for separating a wavelength band corresponding to at least one maximum sensitivity wavelength band into a plurality of separated components is deposited at different positions in an identical plane.

19. An exposure controlling apparatus according to claim 16, wherein said first sensor comprises a filter on which are deposited a first interference film for separating a wavelength band corresponding to a maximum sensitivity wavelength band into a plurality of separated components and a second interference film for separating a wavelength band other than the wavelength band corresponding to the maximum sensitivity wavelength band into a plurality of separated components having a half-width wider than that of said first interference film.

20. An exposure controlling apparatus according to claim 16, wherein said first sensor comprises a filter on which are deposited a first interference film for separating a wavelength band corresponding to a maximum sensitivity wavelength band into a plurality of separated components at at intervals of a narrow wavelength and a second interference film for separating a wavelength band other than the wavelength band corresponding to the maximum sensitivity wavelength band into a plurality of separated components at intervals of a wider wavelength than said intervals of said wavelength.

21. An exposure controlling apparatus according to claim 16, wherein said first sensor comprises interference films or filters, disposed at positions where said interference films or said filters are not adjacent to each other, for separating a wavelength band corresponding to a maximum wavelength band into a plurality of separated components.

* * * * *